(12) United States Patent
Take et al.

(10) Patent No.: US 7,453,647 B2
(45) Date of Patent: Nov. 18, 2008

(54) COMMOM ZOOM OPTICAL SYSTEM

(75) Inventors: Toshinori Take, Tokyo (JP); Daisaku Arai, Kawasaki (JP)

(73) Assignee: Nikon Corporation, Tokyo (JP)

( * ) Notice: Subject to any disclaimer, the term of this patent is extended or adjusted under 35 U.S.C. 154(b) by 0 days.

(21) Appl. No.: 11/237,853

(22) Filed: Sep. 29, 2005

(65) Prior Publication Data
US 2006/0066958 A1   Mar. 30, 2006

(30) Foreign Application Priority Data
Sep. 30, 2004 (JP) .............................. 2004-289038
Sep. 21, 2005 (JP) .............................. 2005-273259

(51) Int. Cl.
G02B 15/14 (2006.01)
G02B 15/02 (2006.01)

(52) U.S. Cl. ..................... 359/676; 359/687; 359/672

(58) Field of Classification Search ......... 359/672–675, 359/687, 689
See application file for complete search history.

(56) References Cited

U.S. PATENT DOCUMENTS 3,030,863 A * 4/1962 Schwartz et al. ............ 359/687
5,082,360 A * 1/1992 Sato et al. ................... 359/675
6,785,056 B2 * 8/2004 Mihara ....................... 359/686

FOREIGN PATENT DOCUMENTS

JP        07-199067 A      8/1995
JP        2003-121738 A    4/2003

* cited by examiner

Primary Examiner—William C Choi
(74) Attorney, Agent, or Firm—Miles & Stockbridge P.C.

(57) ABSTRACT

The common zoom optical system is provided that is almost commonly used in a plurality of zoom lenses as a component and that is capable of suppressing fluctuation in aberrations and deviation in the position of the image plane, wherein the common zoom optical system is almost commonly used in a plurality of zoom lenses as a component, and when zooming from a wide-angle end state of a plurality of the zoom lenses composed by use of the common zoom optical system to a telephoto end state thereof, a moving path of the common zoom optical system differs for each zoom lens.

16 Claims, 17 Drawing Sheets

COMMOM ZOOM OPTICAL SYSTEM

This application claims the benefit of Japanese Patent applications No. 2004-289038 and No. 2005-273259 which are hereby incorporated by reference.

BACKGROUND OF THE INVENTION

1. Field of the Invention

The present invention relates to a common zoom optical system almost commonly used as a component in a plurality of zoom lenses suitable for a video camera, digital still camera and the like using a solid-state image pick-up device and the like.

2. Related Background Art

Generally, a zoom lens has a merit in that a user can take a photograph with high degree of freedom while choosing a focal length at random (a state of a focal length of a lens being the shortest is a wide-angle end state and a state of a focal length of a lens being the longest is a telephoto end state.) Thus, in recent years, the zoom lens has been typically mounted on a camera photographing a subject using the solid-state image pick-up device such as CCD, MOS, etc., for example, the digital still camera, the video camera and the like. And in conjunction with this, a camera has been popular that increases a value dividing a focal length in a telephoto end state by a focal length in a wide-angle end state, namely, a zoom ratio and secures the long focal length in the telephoto end state and today such the camera has been broadly accepted by users, and many cameras with various specifications have been marketed.

Generally, in the digital still camera, the video camera and the like, a plurality of zoom lenses having different specifications for each product series has been developed. However, in order to develop a plurality of zoom lenses for each product series, much burden becomes necessary with respect to R&D manpower, development length and cost for expanding production facilities like production lines.

Then, in order to beef up the product series, by employing one optical system in another zoom lens as a common lens component, it becomes possible to develop a plurality of zoom lenses for each product series, too. But, these zoom lenses become similar in specifications such as the focal length, an f-number, the zoom ratio and the like, thereby resulting in increase in a camera having the similar specifications.

With such the background, a zoom lens has been known that is configured to include, in order from an object side, a first lens group having positive refractive power, a second lens group having negative refractive power, a third lens group having positive refractive power, a fourth lens group having positive refractive power and a fifth lens group having positive refractive power, and only change a screen size without changing angle of view by removing the fifth lens group (e.g., see Japanese Patent Application Laid-open No. 2003-121738.)

Also, a zoom lens has been known that is configured to include a taking lens and a changing lens group, and change the screen size without changing angle of view by placing the changing lens group on the optical path of the taking lens (e.g., see Japanese Patent Application Laid-open No. H07-199067.)

However, there are drawbacks in that fluctuation in aberrations and deviation in a position of an image plane can arise respectively upon zooming, by removing the fifth lens group in the zoom lens disclosed in Japanese Patent Application Laid-open No. 2003-121738 or placing the changing lens group in the zoom lens disclosed in Japanese Patent Application Laid-open No. H07-199067.

SUMMARY OF THE INVENTION

The present invention is made in view of the aforementioned problems and has an object to provide a common zoom optical system which is almost commonly used in a plurality of zoom lenses as a component, and capable of suppressing fluctuation in aberrations and deviation in the position of the image plane upon zooming.

In order to solve the above-mentioned problems, the present invention provides a common zoom optical system that is almost commonly used in a plurality of zoom lenses as a component, wherein when a plurality of the zoom lenses composed by use of the common zoom optical system zooms from a wide-angle end state to a telephoto end state, a moving trajectory of the common zoom optical system differs for each zoom lens.

The common zoom optical system of the present invention is preferably used in a first zoom lens including the common zoom optical system alone and a second zoom lens including at least one lens group and the common zoom optical system.

The common zoom optical system of the present invention is preferably used in a first zoom lens including at least one lens group and the common zoom optical system, and a second zoom lens including at least one lens group and the common zoom optical system, the second zoom lens being different from the first zoom lens.

In the common zoom optical system, a lens group at the most object side in the common zoom optical system has negative refractive power, and the common zoom optical system is preferably used in a first zoom lens including the common zoom optical system alone, and a second zoom lens including a lens group having positive refractive power locating at the most object side and the common zoom optical system.

The common zoom optical system includes, in order from an object side, a first lens group having negative refractive power, a second lens group having positive refractive power, and a third lens group having positive refractive power, wherein the common zoom optical system is preferably used in a first zoom lens including the common zoom optical system alone, and a second zoom lens including a lens group having positive refractive power locating at the most object side and the common zoom optical system.

The common zoom optical system includes a plurality of zoom lenses, and preferably satisfies the following conditional expression:

$$0.90 < fan/fbn < 1.10$$

where fan denotes a focal length of a lens group of n-th order of the common zoom optical system in an arbitrary zoom lens among a plurality of the zoom lenses composed by use of the common zoom optical system (n is an integer), and fbn denotes a focal length of a lens group of n-th order of the common zoom optical system in zoom lenses other than said arbitrary zoom lens among a plurality of the zoom lenses composed by use of the common zoom optical system (n is an integer).

It is preferable that an aerial distance between adjacent lens elements composing the common zoom optical system is the same in a plurality of the zoom lenses composed by use of the common zoom optical system.

The common zoom optical system preferably includes at least one aspherical lens element.

The common zoom optical system preferably includes a filter group, and an image pick-up device.

It is preferable that the common zoom optical system includes an aperture stop, and satisfies the following conditional expression:

$$0.95 < Sa/Sb < 1.05$$

where Sa denotes a maximum diameter of the aperture stop in an arbitrary zoom lens among a plurality of the zoom lenses composed by use of the common zoom optical system; and Sb denotes a maximum diameter of the aperture stop in zoom lenses other than the arbitrary zoom lens among a plurality of the zoom lenses composed by use of the common zoom optical system.

It is preferable that a lens group locating at the most image side in the common zoom optical system has at least one aspherical lens element.

According to the present invention, a common zoom optical system can be provided that is almost commonly used as a component in a plurality of zoom lenses and is capable of suppressing fluctuation in aberrations and deviation in a position of an image plane upon zooming.

DESCRIPTION OF THE MOST PREFERRED EMBODIMENTS

Figure 1A:
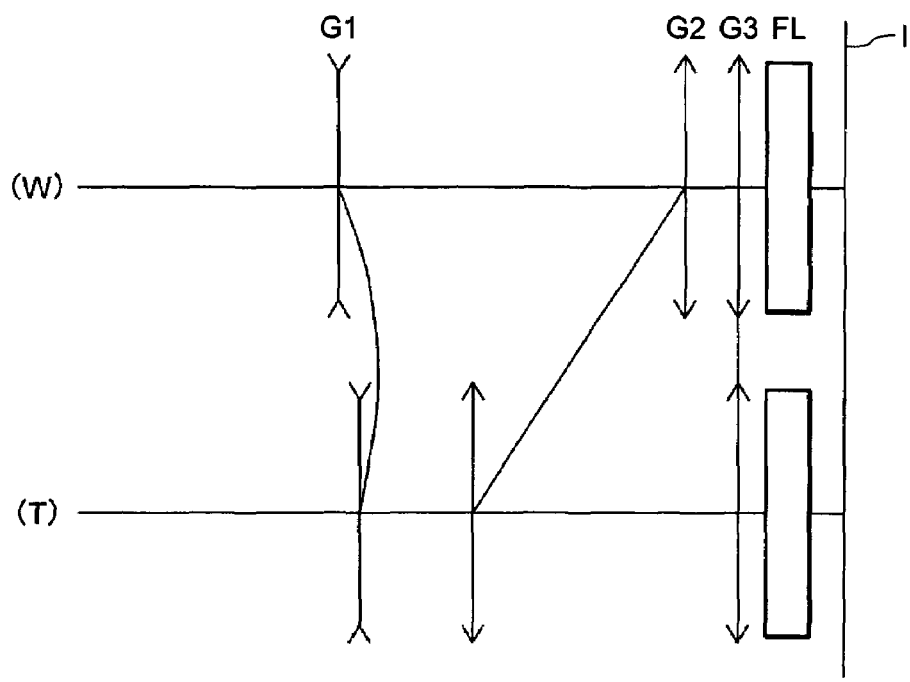
FIGS. 1A and 1B are diagrams each showing a refractive power distribution of zoom lenses A and B composed by use of the common zoom optical system according to each example of the present invention and a moving trajectory of each lens group when the focal length state varies from a wide-angle end state (W) to a telephoto end state (T).

A common zoom optical system of the present invention can be almost commonly used as a component in a plurality of zoom lenses, and is configured such that, when zooming from a wide-angle end state to a telephoto end state in a plurality of zoom lenses composed by use of the common zoom optical system, a moving trajectory of the common zoom optical system differs for each zoom lens.

In a plurality of zoom lenses, by standardizing a lens component of lens groups and/or a lens barrel component inside a lens barrel, lens components for a plurality of zoom lenses and the like can be developed at a time, thereby enabling the development period to be shortened.

Regarding a production, inspection process of a component can be implemented at a single site, so that troubles like a similar component is mixed into can be avoided in advance. And, in an assembling process and the like, by assembling similar component in large quantity, workers' skill is enhanced, so that assembling stability can be secured. With respect to cost, mass-produced same components enable a great reduction of cost.

As stated above, by using the already-existing common component, it becomes possible to develop a plurality of products having different specifications while holding down a buildup in development manpower and production facilities.

Herein, "almost commonly" of "almost commonly used in a plurality of zoom lenses as a component" described in the present application and claims means that, when building a common zoom optical system of the present invention into a plurality of zoom lenses as a component, in addition to the common zoom optical system being intact built into the plurality of zoom lenses, it can be also built into by changing an aerial distance and/or a radius of curvature of a lens component, etc. in the common zoom optical system.

In an event that there is no a common lens group when developing a plurality of zoom lenses, extra development as an occasion demands might prolong development period in progress and/or might push up costs such as a mold and the like. Thus, in a plurality of zoom lenses, a plurality of common lens components have more merits than only one common lens component such as cost, productivity and the like, and this is more preferable.

Furthermore, in a common zoom optical system of the present invention, it is desirable that a lens group at the most object side of the common zoom optical system has negative refractive power, and the common zoom optical system is used in a first zoom lens consisting of the common zoom optical system alone and a second zoom lens consisting of a lens group at the most object side having positive refractive power and the common zoom optical system.

In general, a zoom ratio of a zoom lens consisting of, in the order from the object side, the first lens group having negative refractive power, the second lens group having positive refractive power and the third lens group having positive refractive power is the order of 3. In such the zoom lens, when the zoom ratio is made more than 3, change in an f-number becomes larger and/or optical performance in a telephoto end state cannot be secured. Usually, in a zoom lens having a higher zoom ratio of 5 or more, by locating a lens group having positive refractive power as a lens group at the most object side, zoom action is further strengthened.

A common zoom optical system of the present invention has advantages in that lens parts can be standardized by using lens parts constructing the first lens group for the second zoom lens, and by adding a small number of lens parts, a plurality of zoom lenses with different specifications like the zoom ratio and the like can be easily developed. As stated before, in the plurality of zoom lenses, the more the common lens groups and lens components, the more the merits such as cost, productivity and the like, and this is preferable. Furthermore, even when the second zoom lens is developed to the first zoom lens by leaving out the lens group at the most object side of the already-existing second zoom lens, there are the same merits as described above, too.

Moreover, it is preferable that the common zoom optical system of the present invention includes a plurality of lenses, and satisfies the following conditional expression (1):

$$0.90 < fan/fbn < 1.10 \quad (1)$$

where fan denotes a focal length of n-th lens group of the common zoom optical system in an arbitrary zoom lens among the plurality of zoom lenses composed by use of the common zoom optical system, and fbn denotes a focal length of n-th lens group of the common zoom optical system in a zoom lens other than said arbitrary zoom lens among the plurality of zoom lenses composed by use of the common zoom optical system.

The conditional expression (1) is to define an appropriate range of the focal length of n-th lens group of the common zoom optical system in an arbitrary zoom lens among the plurality of zoom lenses composed by use of the common zoom optical system of the present invention and the focal length of n-th lens group of the common zoom optical system in the zoom lens other than the arbitrary zoom lens.

Exceeding the upper limit or falling below the lower limit of conditional expression (1), in the plurality of zoom lenses composed by use of the common optical system of the present invention, a lens component in each lens group and lens barrel parts inside the lens barrel for holding the lens component might not be standardized. Thus, this runs counter to the object of the present invention.

By satisfying above-mentioned conditional expression (1), the common zoom optical system makes it possible to standardize the lens component and/or the lens barrel parts and the like among the plurality of zoom lenses, and then achieve the component standardization as well as cost reduction. Furthermore, by satisfying the lower value of conditional expression (1) with 0.95 and the upper value thereof with 1.05, the common zoom optical system of the present invention can make full use of the above-mentioned effect.

Moreover, in the common zoom optical system of the present invention, it is desirable that an aerial distance between adjacent lens elements constructing the common zoom optical system is the same as in the plurality of zoom lenses composed by use of the common zoom optical system.

In the plurality of zoom lenses, if the aerial distance between lens components is the same, the lens barrel parts and the like inside the lens barrel for holding the lens component can be standardized. This enables shorter development time and a reduction of development manpower. Furthermore, production of the same lens barrel component in large quantity makes it possible to further reduce cost and stabilize production.

Moreover, in order to standardize the component and reduce cost, it is desirable that the common zoom optical system of the present invention is provided with at least one aspherical lens.

With this, subcontractors for fabricating an aspherical lens can be unified, and the common zoom optical system of the present invention makes it possible to reduce cost with mass-production. Furthermore, generally, by introducing the aspherical lens into the lens group nearby an aperture stop, aberrations on the axis can be corrected well.

In order to further standardize the component and reduce cost, it is desirable that the common zoom optical system of the present invention is provided with a filter group such as an optical low pass filter and the like and an image pick-up device such as CCD and the like.

The common zoom optical system of the present invention can reduce cost by standardizing an optical element like the filter and the like. Moreover, as a mechanical unit nearby an image pick-up device can be used intact in a zoom lens of another product series, a period of developing a zoom lens of another product series can be shortened, too.

Also, in order to standardize the component and reduce cost, it is preferable that the common zoom optical system of the present invention is provided with an aperture stop, and satisfies a following conditional expression (2):

$$0.95 < Sa/Sb < 1.05 \quad (2)$$

where Sa denotes a maximum diameter of an aperture stop in an arbitrary zoom lens among the plurality of zoom lenses composed by use of the common zoom optical system, and Sb denotes a maximum diameter of an aperture stop in a zoom lens other than the arbitrary zoom lens among the plurality of zoom lenses composed by use of the common zoom optical system.

The conditional expression (2) is a conditional expression to define an appropriate range of a maximum diameter of an aperture stop in an arbitrary zoom lens among the plurality of zoom lenses composed by use of the common zoom optical system, and the maximum diameter of an aperture stop in a zoom lens other than the arbitrary zoom lens.

Exceeding the upper limit or falling below the lower limit of conditional expression (2), in the plurality of zoom lenses composed by use of the common zoom optical system of the present invention, the diameter of the aperture stop differs. As a result, it becomes impossible to standardize a shutter unit having the aperture stop and the like for common use, thereby running counter to the object of the present invention.

By satisfying above-mentioned conditional expression (2), the common zoom optical system makes it possible to standardize the shutter unit and the like, and then achieve further parts standardization as well as cost reduction.

Also, in the common zoom optical system of the present invention, in order to achieve further parts standardization as well as cost reduction, it is desirable that a lens group at the most object side in the common zoom optical system is provided with at least one aspherical lens.

By standardizing the aspherical lens as stated above, the common zoom optical system makes it possible to achieve further cost reduction. Also, by introducing the aspherical lens into the lens group at the most object side in the common zoom optical system, fluctuation in aberrations off the axis can be corrected well.

According to a preferred embodiment of the present invention, it is preferable that as described below, the common zoom optical system of the present invention is composed as a first zoom lens, and a second zoom lens is composed using the first zoom lens.

First of all, the first zoom lens includes, in order from an object side, a first lens group having negative refractive power, a second lens group having positive refractive power, and a third lens group having positive refractive power. When changing a focal length from a wide-angle end state of the focal length being shortest to a telephoto end state of the focal length being longest, the first lens group and the second lens group are composed to be moved such that a distance between the first lens group and the second lens group varies and a distance between the second lens group and the third lens group increases, and the third lens group is composed so as to adjust focusing.

The first lens group in the first zoom lens includes, in order from an object side, a negative meniscus lens with a convex surface facing to the object side, a negative lens with a double concave shape and a positive lens with a convex surface facing to the object side.

The second lens group includes, in order from an object side, an aperture stop, a positive lens with at least one surface being an aspherical surface and a convex surface facing to the object side, and a cemented lens constructed by a positive lens with a convex surface facing to the object side and a negative lens with a concave surface facing to an image side.

The third lens group includes a positive lens with at least one surface being an aspherical surface and a convex surface facing to the image side.

The second zoom lens includes, in order from an object side, a positive lens group having positive refractive power, a first lens group having negative refractive power, a second lens group having positive refractive power and a third lens group having positive refractive power. When changing a focal length from a wide-angle end state to a telephoto end state, the positive lens group, the first lens group and the second lens group are composed to be moved such that a distance between the positive lens group and the first lens group varies, a distance between the first lens group and the second lens group decreases, and a distance between the second lens group and the third lens group increases, and the third lens group is composed so as to adjust focusing.

The positive lens group in the second lens group includes a cemented lens having, in order from an object side, a negative meniscus lens with a convex surface facing to the object side and a positive lens with a convex surface facing to the object side.

The first lens group includes, in order from an object side, a negative meniscus lens with a convex surface facing to the object side, a negative lens with a double concave shape and a positive lens with a convex surface facing to the object side.

The second lens group includes, in order from an object side, an aperture stop, a positive lens with at least one surface being an aspherical surface and a convex surface facing to the object side and a cemented lens constructed by a positive lens with a convex surface facing to the object side and a negative lens with a concave surface facing to an image side.

The third lens includes a positive lens with at least one surface being an aspherical surface and a convex surface facing to an object side.

As described above, by using the first zoom lens as a whole in the second zoom lens as the common zoom optical system, two types of zoom lenses can be achieved.

Herein, a function of respective lens group in the first zoom lens and the second zoom lens will be described.

The first lens group in the first zoom lens acts to correct deviation in an image plane due to zooming.

The second lens group in the first zoom lens acts to enlarge a subject image, and when zooming from a wide-angle end state to a telephoto end state, by changing the distance between the first lens group and the second lens group, acts to increase a magnification and change a focal length.

The third lens group in the first zoom lens adjusts focusing on the subject image formed by the first lens group and the second lens group as well as controls a position of an exit pupil.

The positive lens group in the second zoom lens acts to converge flux of light. The positive lens group, in a wide-angle end state, is located close to the image plane as much as possible such that off-axis flux of light passes through distant from the optical axis, thereby making a lens diameter of the positive lens group small. In a telephoto end state, by moving the positive lens group toward the object side such that a distance between the positive lens group and the first lens group increases, the positive lens group enhances converging action and shortens an overall length of the lens system.

The first lens group in the second zoom lens acts to enlarge the subject image formed by the positive lens group and when zooming from a wide-angle end state to a telephoto end state, by increasing the distance between the first lens group and the positive lens group, the first lens group acts to increase a magnification and change a focal length.

The second lens group in the second zoom lens acts to converge flux of light diverged by the first lens group. In order to achieve higher performance, it is preferable that the first lens group includes a plurality of lens groups.

The third lens group in the second zoom lens adjusts focusing on the subject image formed by the positive lens group, the first lens group and the second lens group as well as controls the position of the exit pupil.

As described above, a plurality of zoom lenses can be achieved by using the common zoom optical system of the present invention.

In general, in the solid-state image pick-up device such as CCD and the like, a micro lens array is arranged just in front of a light receptive device in order to improve efficiency of light sensitivity. For this reason, it is necessary that the first zoom lens and the second zoom lens used in cameras keep the position of the exit pupil distant from a surface of the light receptive device.

In a common zoom optical system according to each preferred embodiment of the present invention to be described later, an aspherical lens is arranged respectively in a second lens group and a third lens group. Arrangement of the aspherical lens in the second lens group enables aberrations on the axis to be corrected well, whereas arrangement of the aspherical lens in the third lens group enables fluctuation in aberrations off the axis to be corrected well.

A zoom lens composed by use of a common zoom optical system according to each preferred embodiment of the present invention to be described later includes three or four movable zoom lens groups, but it is also possible to add another new lens group by placing another new lens group in-between each lens group or making another new lens group adjacent an image side or an object side of the zoom lens.

In a zoom lens composed by use of a common zoom optical system of the present invention, in order to avoid a picture failure due to image blur originated in a hand shake and/or any vibration apt to arise in a zoom lens having a high zoom ratio, a vibration detective system detecting vibration of the lens system and an actuator may be combined with the lens system, and the whole of one lens group among lens groups composing the lens system or a part thereof may be composed so as to be eccentric as a shift lens group. With this, image blur can be corrected by activating the shift lens group with the actuator and shifting the image so as to correct image blur originated in vibration of the lens system detected by the vibration detective system, that is, fluctuation in the position of the image plane. It is also possible to cause the zoom lens composed by use of the common zoom optical system of the present invention to act as a so-called vibration reduction optical system.

Moreover, with a configuration of sharing a zoom trajectory partially, it is also possible for the zoom lens composed by use of the common zoom optical system of the present invention to work with an image pick-up device having different image height and the like.

A common zoom optical system according to each preferred embodiment of the present invention and a plurality of zoom lenses (zoom lenses A and B) composed by use of the common zoom optical system will be described below based upon accompanying diagrams.

Figure 1B:
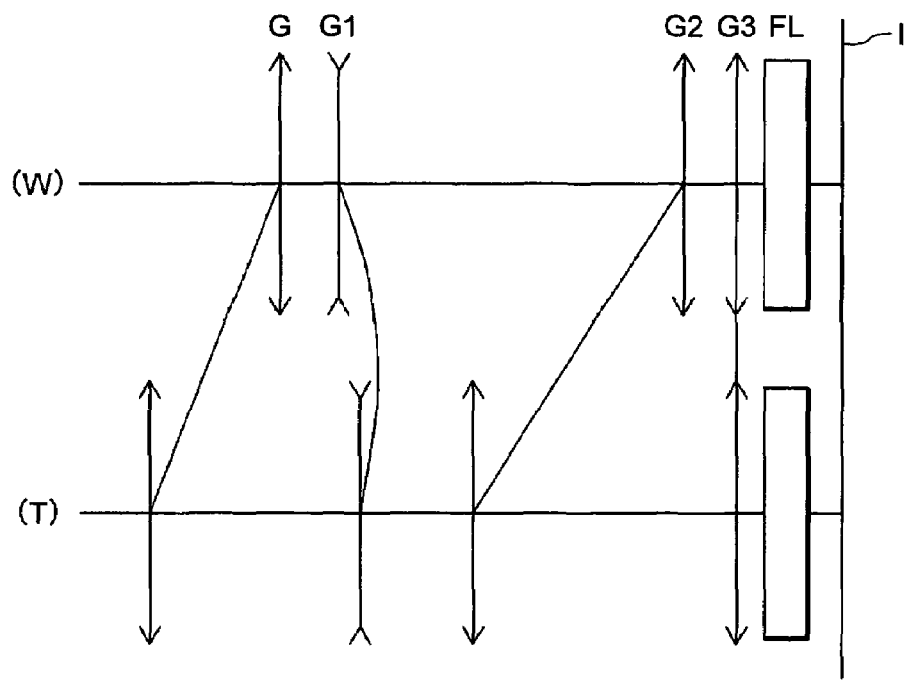

FIGS. 1A and 1B are diagrams each showing a refractive power distribution of zoom lenses A and B composed by use of a common zoom optical system according to each preferred embodiment of the present invention and a moving trajectory view of each lens group when changing a focal length state from a wide-angle end state (W) to a telephoto end state (T). A common zoom optical system in accordance with each preferred embodiment is zoom lens A itself, so its configuration will be described below as zoom lens A.

As shown in FIGS. 1A and 1B, zoom lens A which is a common zoom optical system according to each preferred embodiment of the present invention includes, in order from an object side, first lens group G1 having negative refractive power, second lens group G2 having positive refractive power, third lens group G3 having positive refractive power, and filter group FL consisting of a filter such as a low pass filter, an infrared cut filter or the like. When zooming from a wide-angle end state to a telephoto end state, a distance between first lens group G1 and second lens group G2 varies, a distance between second lens group G2 and third lens group G3 decreases, and third lens group G3 adjust focusing.

A zoom lens B composed by using the common zoom optical system according to each preferred embodiment of the present invention includes, in order from an object side, positive lens group G having positive refractive power, first lens group G1 having negative refractive power, second lens group G2 having positive refractive power, third lens group G3 having positive refractive power, and filter group FL consisting of a filter such as a low pass filter, an infrared cut filter or the like. When zooming from a wide-angle end state to a telephoto end state, a distance between positive lens group G and first lens group G1 and a distance between first lens group G1 and second lens group G2 vary, a distance between second lens group G2 and third lens group G3 decreases, and third lens group G3 adjust focusing.

With such the configuration, a moving trajectory of each lens group composing a common zoom optical system in zoom lens A, that is overall zoom lens A upon zooming from a wide-angle end state to a telephoto end state is different from that of each lens group composing the common zoom optical system in the zoom lens B upon zooming from a wide-angle end state to a telephoto end state.

FIRST EXAMPLE

Figure 2:
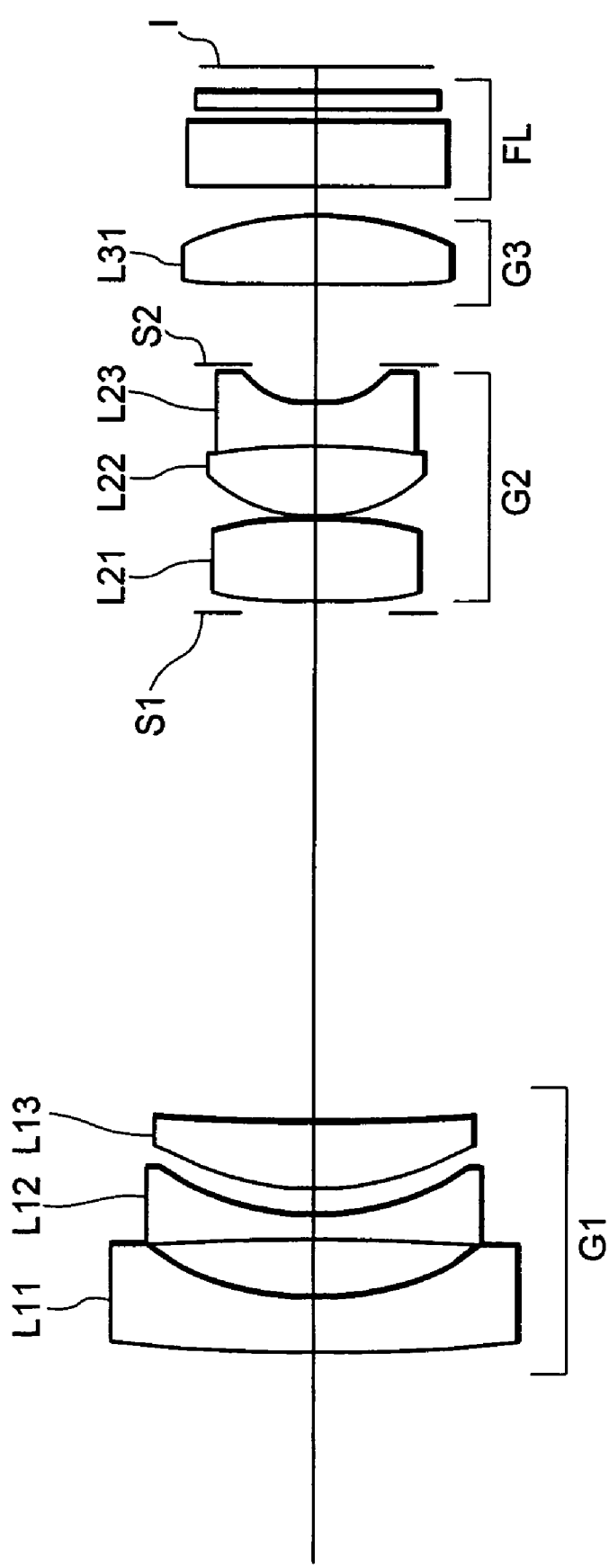
FIG. 2 is a diagram showing lens construction of the zoom lens A composed by use of the common zoom optical system according to a first example of the present invention.
Figure 3:
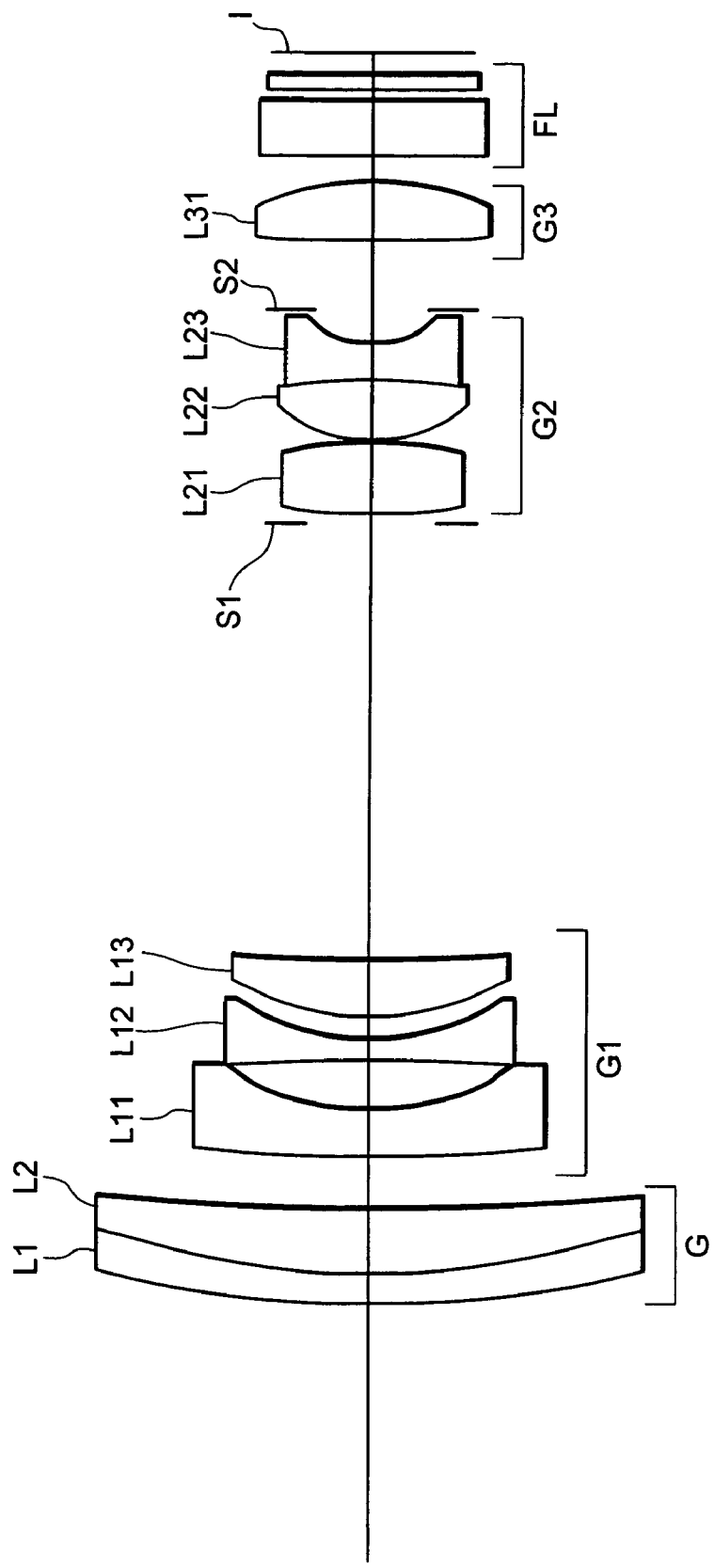
FIG. 3 is a diagram showing lens construction of the zoom lens B composed by use of the common zoom optical system according to the first example of the present invention.

FIGS. 2 and 3 are views showing configurations of zoom lenses A and B composed by use of a common zoom optical system according to a first example of a preferred embodiment of the present invention.

In the zoom lens A shown in FIG. 2, a first lens group G1 includes, in order from an object side, a negative meniscus lens L11 with a convex surface facing to an object side, a double concave negative lens L12 and a positive meniscus lens L13 with a convex surface facing to an object side.

A second lens group G2 includes, in order from an object side, an aperture stop S1, a double convex positive lens L21, a negative cemented lens constructed by a double convex positive lens L22 and a double concave negative lens L23 and a flare stop S2.

A third lens group G3 is composed of a double convex positive lens element L31.

A filter group FL includes a low pass filter, an infrared cut filter or the like.

An image plane I is formed on an image pick-up device (not shown), and the image pick-up device is composed of CCD, CMOS or the like (the image pick-up device is the same in following examples).

The aperture stop S1 and the flare stop S2 are moved in a body with each lens composing the second lens group G2 upon zooming from a wide-angle end state to a telephoto end state.

In the zoom lens B shown in FIG. 3, the positive lens group G includes a positive cemented lens constructed by, in order from the object side, a negative meniscus lens L1 with a convex surface facing to the object side and a positive meniscus lens L2 with a convex surface facing to the object side.

Except for the positive lens group G, each lens group, the filter group FL, the image plane I and the image pick-up device are the same configuration as those of the zoom lens A which is the common zoom optical system, so that the duplicated explanation will be left out in following examples.

Various values for specifications of zoom lenses A and B composed by use of a common zoom optical system according to the first example of the preferred embodiment of the present invention are shown below in Tables 1 and 2. In each table, f denotes a focal length, FNO denotes an f-number, 2ω denotes an angle of view, and Bf denotes a back focal length, respectively. In each table, the wide-angle end state is denoted by "W", the intermediate focal length state is denoted by "M", and the telephoto end state is denoted by "T". In [Lens Data], the left most column is a surface number in order from the object side along a direction of light beam advancing, the second column "r" is radius of curvature of each lens surface, the third column "d" is a distance between the lens surfaces, and the fourth and fifth columns "n" and "ν" are refractive index and Abbe number relative to d-line (λ=587.6 nm), respectively. Radius of curvature 0.0000 denotes a plain surface and refractive index of an air, 1.0000 is left out.

In each zoom lens, an aspherical surface is expressed by the following expression:

$$S(y) = (y^2/R)/\{1+(1-\kappa \times y^2/R^2)^{1/2}\} + C_4 \times y^4 + C_6 \times y^6 + C_8 \times y^8 + C_{10} \times y^{10}$$

where y denotes a height in a direction perpendicular to the optical axis, a distance along the optical axis from a tangential surface at the vertex of each aspherical surface to the position on each aspherical surface at height y is denoted by S(y) (sag amount), a paraxial radius of curvature, that is, a radius of curvature of a reference sphere is denoted by R, a conical constant is denoted by κ and an aspherical coefficient of the n-th order is denoted by $C_n$, respectively.

In each example, the 2nd order aspherical coefficient $C_2$ is 0, so that its description will be left out. And, paraxial radius of curvature R is equal to radius of curvature r of the reference sphere. Furthermore, an aspherical surface in each zoom lens is expressed in [Lens Data] by "*" attached to the left side of the surface number.

Though the unit of length such as the focal length, the radius of curvature, the distance between surfaces and the other data described in various values of all the specifications below is generally expressed in "mm", the unit of the data is not limited to "mm" since the optical system can provide the same optical performance even if it is proportionally enlarged or reduced.

The above-mentioned explanation is the same in a second example preferred embodiment to be described later.

TABLE 1

[Specifications of the zoom lens A]

|  | W | M | T |
|---|---|---|---|
| f = | 5.85 | 7.91 | 16.65 |
| FNO = | 2.77 | 3.21 | 5.10 |
| 2ω = | 68.72° | 48.24° | 23.15° |

[Lens Data of the zoom lens A]

|  | r | d | n | ν |
|---|---|---|---|---|
| 1 | 71.9205 | 1.95 | 1.83400 | 37.16 |
| 2 | 10.8299 | 2.00 | | |
| 3 | −83.3957 | 0.90 | 1.62041 | 60.29 |
| 4 | 9.7238 | 0.98 | | |
| 5 | 10.9720 | 2.39 | 1.75519 | 27.51 |
| 6 | 70.2969 | (d6) | | |
| 7 | 0.0000 | 0.40 | (aperture stop S1) | |
| *8 | 20.0828 | 3.00 | 1.60602 | 57.44 |
| 9 | −14.8754 | 0.10 | | |
| 10 | 5.8436 | 2.50 | 1.72000 | 46.02 |
| 11 | −25.0045 | 1.50 | 1.75519 | 27.51 |
| 12 | 3.8920 | 1.14 | | |
| 13 | 0.0000 | (d13) | (flare stop S2) | |
| 14 | 100.0000 | 2.50 | 1.58913 | 61.25 |
| *15 | −8.6501 | (d15) | | |

TABLE 1-continued

| 16 | 0.0000 | 2.30 | 1.54437 | 70.51 |
|---|---|---|---|---|
| 17 | 0.0000 | 0.33 | | |
| 18 | 0.0000 | 0.60 | 1.51633 | 64.14 |
| 19 | 0.0000 | (Bf) | | |

[Aspherical Data of the zoom lens A]

Surface Number 8

R = 20.0828
κ = −5.1687
$C_4 = -4.6911 \times 10^{-5}$
$C_6 = -1.8646 \times 10^{-6}$
$C_8 = +6.1417 \times 10^{-8}$
$C_{10} = -6.2733 \times 10^{-10}$ Surface Number 15

R = −8.6501
κ = +2.0692
$C_4 = +1.0096 \times 10^{-3}$
$C_6 = -8.0882 \times 10^{-6}$
$C_8 = +1.5737 \times 10^{-7}$
$C_{10} = +6.9232 \times 10^{-9}$

[Variable Distance Data of the zoom lens A]

|  | W | M | T |
|---|---|---|---|
| f | 5.8500 | 7.9060 | 16.6500 |
| d6 | 16.2664 | 11.2138 | 3.6659 |
| d13 | 4.5682 | 7.1568 | 18.1686 |
| d15 | 1.0000 | 1.0000 | 1.0000 |
| Bf | 0.9999 | 0.9905 | 0.9901 |

TABLE 2

[Specifications of the zoom lens B]

|  | W | M | T |
|---|---|---|---|
| f = | 5.95 | 17.00 | 29.55 |
| FNO = | 2.53 | 3.79 | 4.72 |
| 2ω = | 62.75° | 22.23° | 12.94° |

[Lens Data of the zoom lens B]

|  | r | d | n | ν |
|---|---|---|---|---|
| 1 | 48.1503 | 1.20 | 1.846660 | 23.78 |
| 2 | 33.9292 | 2.68 | 1.754998 | 52.32 |
| 3 | 148.4214 | (d3) | | |
| 4 | 71.9205 | 1.95 | 1.834000 | 37.16 |
| 5 | 10.8299 | 2.00 | | |
| 6 | −83.3957 | 0.90 | 1.620411 | 60.29 |
| 7 | 9.7238 | 0.98 | | |
| 8 | 10.9720 | 2.39 | 1.755199 | 27.51 |
| 9 | 70.2969 | (d9) | | |
| 10 | 0.0000 | 0.40 | (aperture stop S1) | |
| *11 | 20.0828 | 3.00 | 1.606020 | 57.44 |
| 12 | −14.8754 | 0.10 | | |
| 13 | 5.8436 | 2.50 | 1.720001 | 46.02 |
| 14 | −25.0045 | 1.50 | 1.755199 | 27.51 |
| 15 | 3.8920 | 1.14 | | |
| 16 | 0.0000 | (d16) | (flare stop S2) | |
| 17 | 100.0000 | 2.50 | 1.589130 | 61.25 |
| *18 | −8.6501 | (d18) | | |
| 19 | 0.0000 | 2.30 | 1.544370 | 70.51 |
| 20 | 0.0000 | 0.33 | | |
| 21 | 0.0000 | 0.60 | 1.516330 | 64.14 |
| 22 | 0.0000 | (Bf) | | |

TABLE 2-continued

[Aspherical Data of the zoom lens B]

Surface Number 11

R = 20.0828
κ = −5.1687
C4 = −4.6911 × 10$^{-5}$
C6 = −1.8646 × 10$^{-6}$
C8 = +6.1417 × 10$^{-8}$
C10 = −6.2733 × 10$^{-10}$

Surface Number 18

R = −8.6501
κ = +2.0692
C4 = +1.0096 × 10$^{-3}$
C6 = −8.0882 × 10$^{-6}$
C8 = +1.5737 × 10$^{-7}$
C10 = +6.9232 × 10$^{-9}$

[Variable Distance Data of the zoom lens B]

|    | W | M | T |
| --- | --- | --- | --- |
| f | 5.9500 | 17.0000 | 29.5500 |
| d3 | 2.1500 | 19.3696 | 31.4000 |
| d9 | 18.4008 | 4.4516 | 0.6318 |
| d16 | 3.1657 | 10.5563 | 15.9387 |
| d18 | 1.0000 | 1.0000 | 1.0000 |
| Bf | 0.9900 | 0.9901 | 0.9901 |

TABLE 3

[Values for Conditional Expressions of the zoom lens A]

fa1 = −13.917
fa2 = 11.963
fa3 = 13.630
fb1 = −13.917
fb2 = 11.963
fb3 = 13.630
Sa = 5.40
Sb = 5.40
(1) fa1/fb1 = 1.00
fa2/fb2 = 1.00
fa3/fb3 = 1.00
(2) Sa/Sb = 1.00

Figure 4:
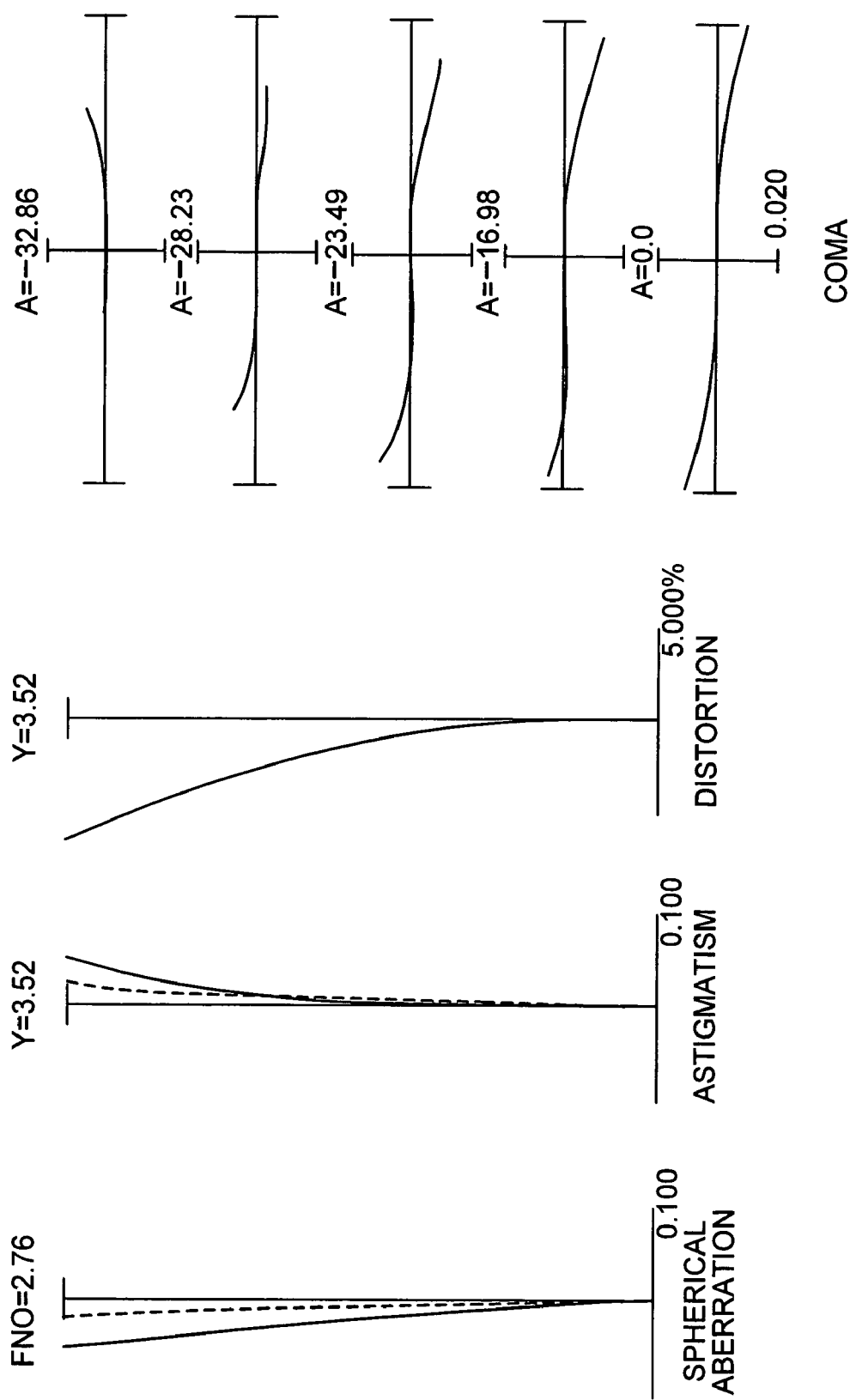
FIG. 4 graphically shows various aberrations of the zoom lens A composed by use of the common zoom optical system according to the first example of the present invention relative to d-line ($\lambda$=587.6 nm), in a wide-angle end state (f=5.85 mm) when the system focusing at infinity.
Figure 5:
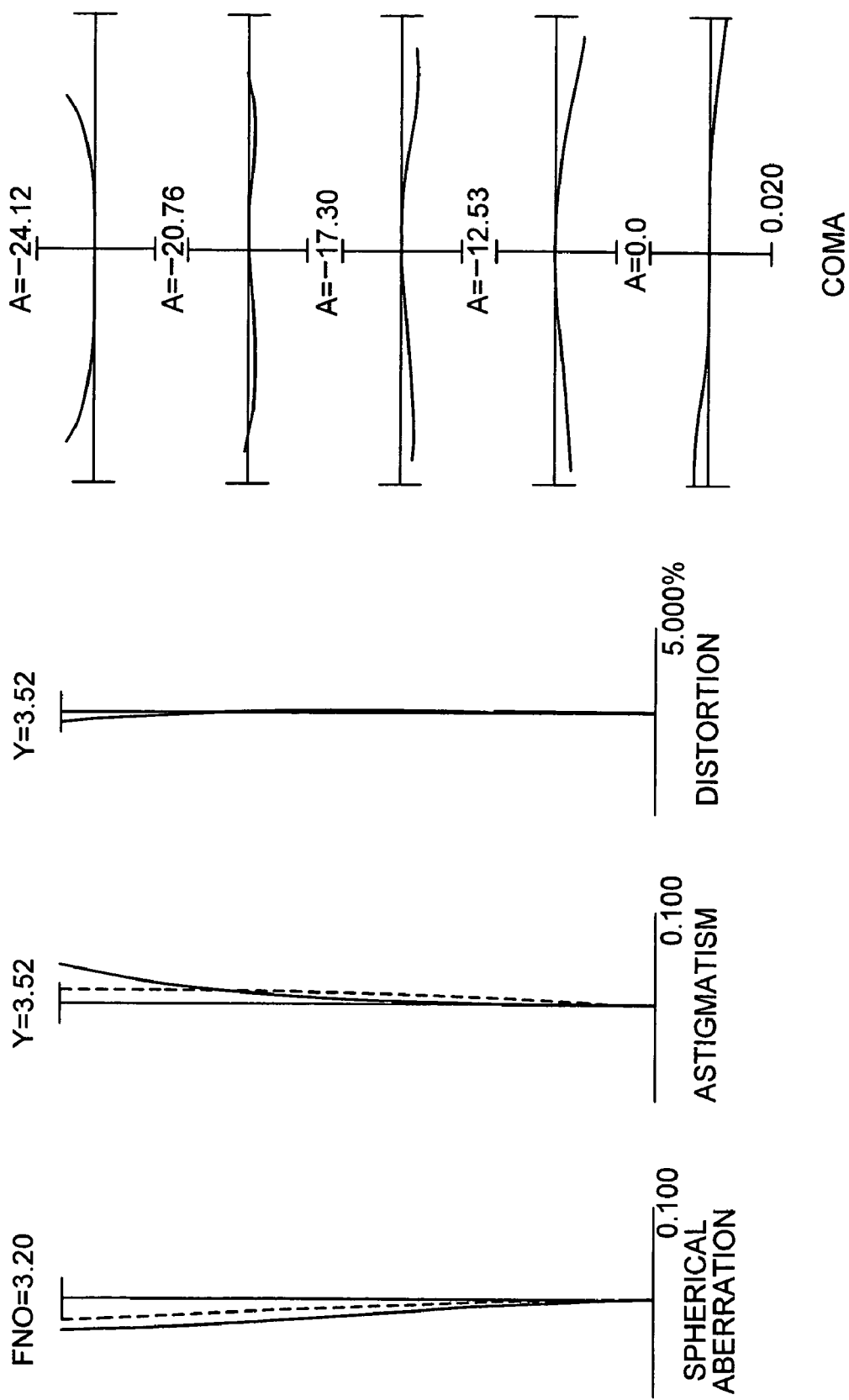
FIG. 5 graphically shows various aberrations of the zoom lens A composed by use of the common zoom optical system according to the first example of the present invention relative to d-line ($\lambda$=587.6 nm), in an intermediate end state (f=7.90 mm) when the system focusing at infinity.
Figure 6:
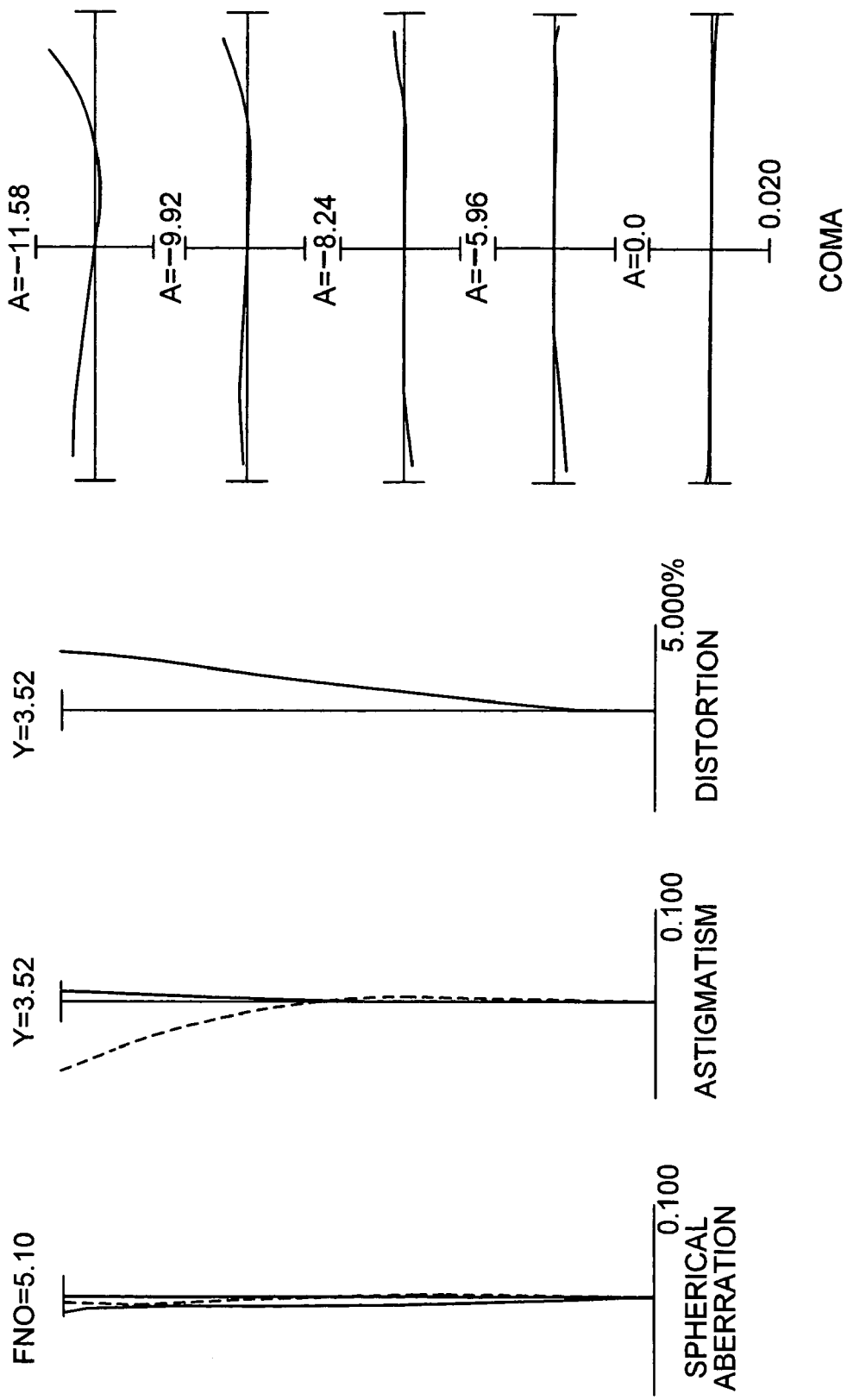
FIG. 6 graphically shows various aberrations of the zoom lens A composed by use of the common zoom optical system according to the first example of the present invention relative to d-line ($\lambda$=587.6 nm), in a telephoto end state (f=16.65 mm) when the system focusing at infinity.

FIGS. 4, 5 and 6 graphically show various aberrations of zoom lens A composed by use of the common zoom optical system according to the first example of the preferred embodiment relative to d-line (λ=587.6 nm) in a wide-angle end state (f=5.85 mm), an intermediate focal length state (f=7.90 mm), and a telephoto end state (f=16.65 mm), respectively, when the system focusing at infinity.

Figure 7:
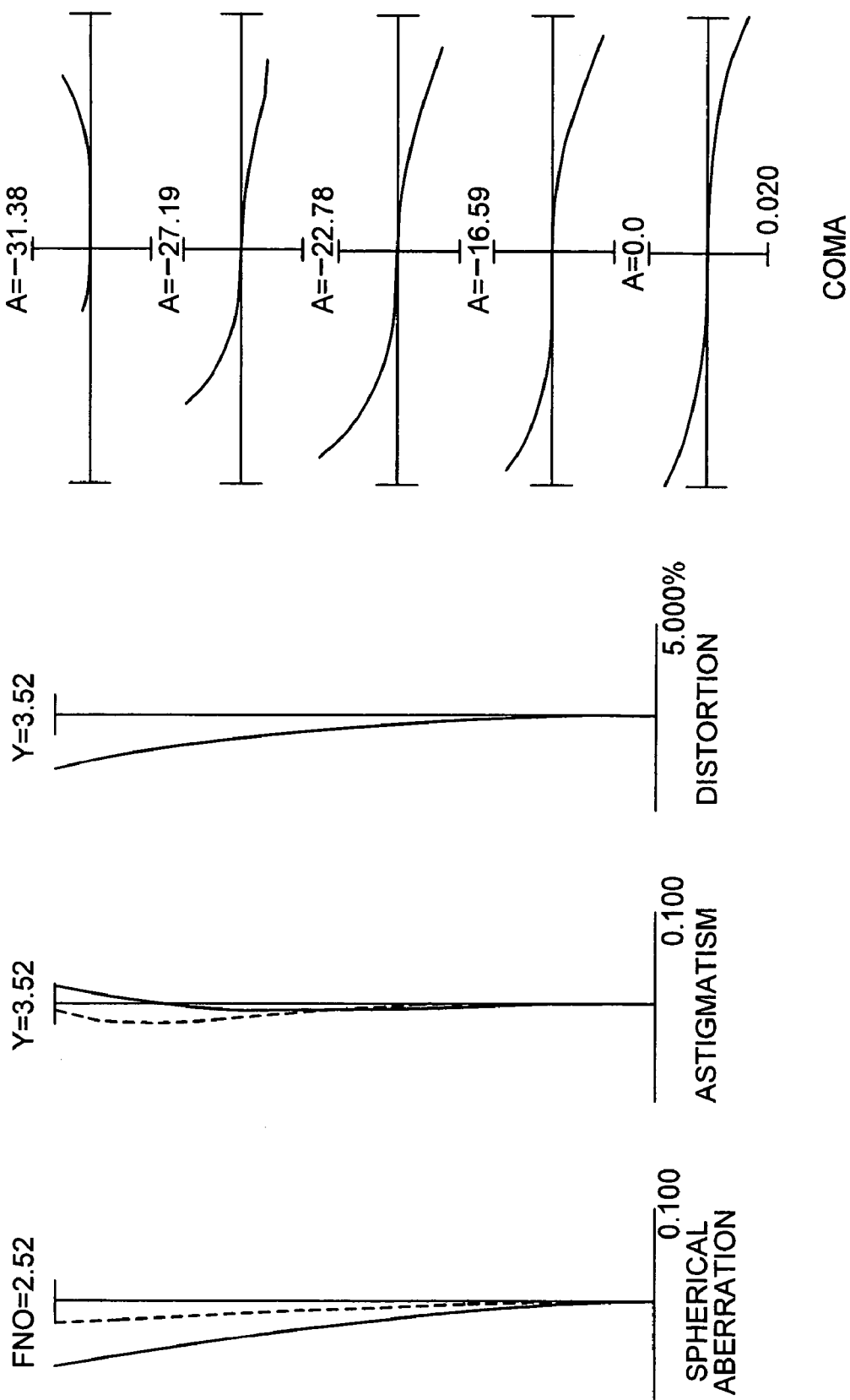
FIG. 7 graphically shows various aberrations of the zoom lens B composed by use of the common zoom optical system according to the first example of the present invention relative to d-line ($\lambda$=587.6 nm), in a wide-angle end state (f=5.95 mm) when the system focusing at infinity.
Figure 8:
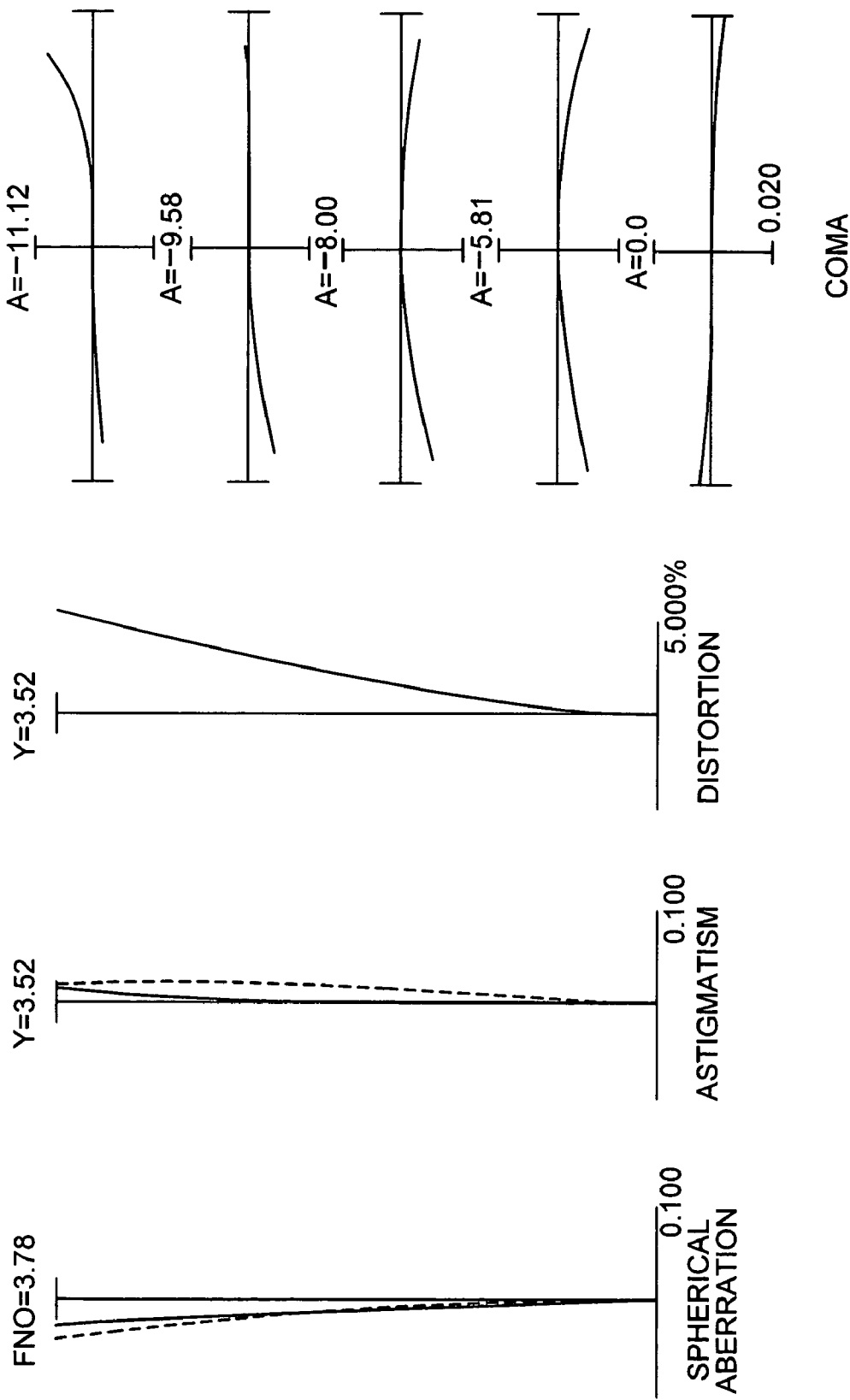
FIG. 8 graphically shows various aberrations of the zoom lens B composed by use of the common zoom optical system according to the first example of the present invention relative to d-line ($\lambda$=587.6 nm), in an intermediate focal length state (f=17.00 mm) when the system focusing at infinity.
Figure 9:
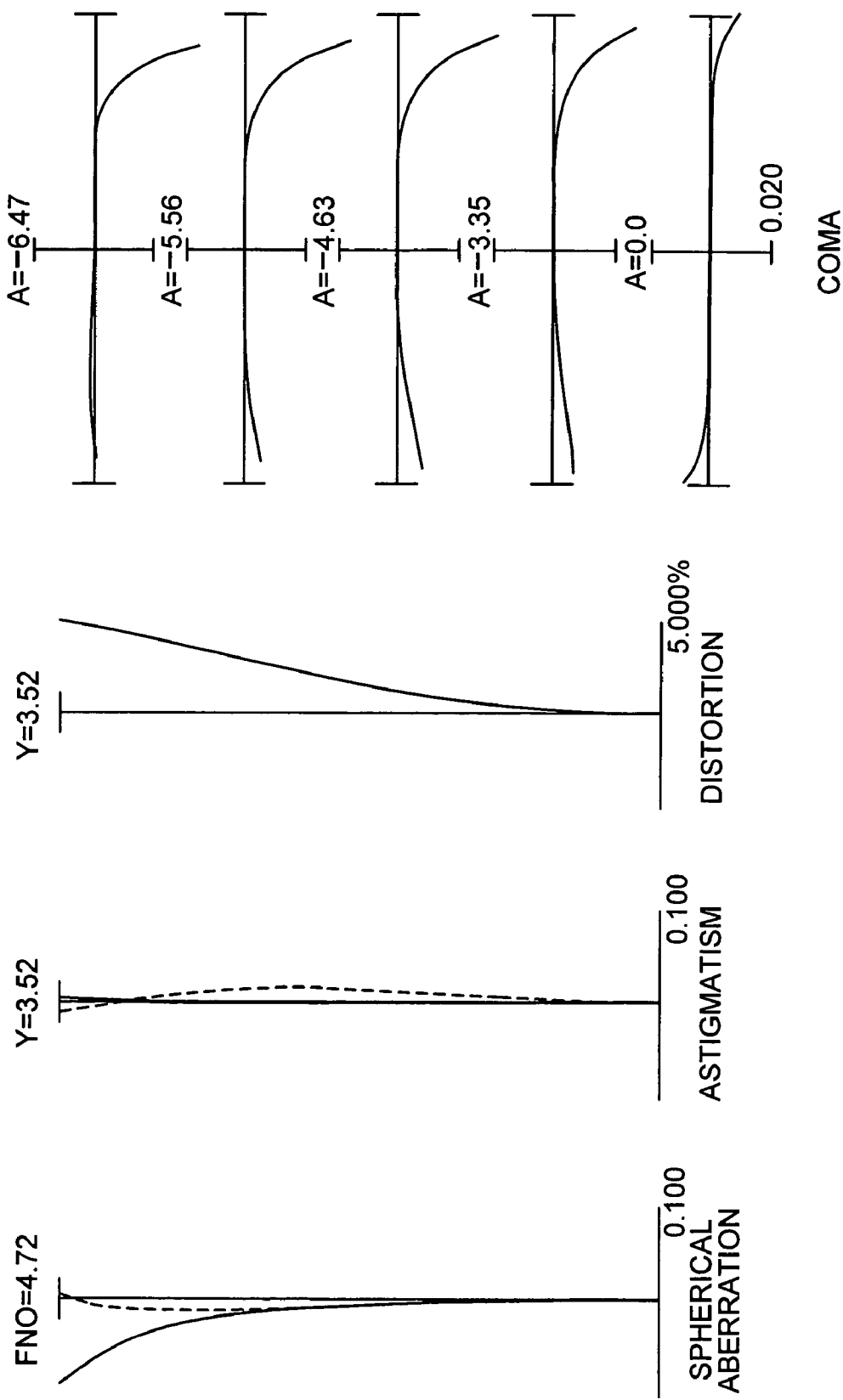
FIG. 9 graphically shows various aberrations of the zoom lens B composed by use of the common zoom optical system according to the first example of the present invention relative to d-line ($\lambda$=587.6 nm), in a telephoto end state (f=29.55 mm) when the system focusing at infinity.

FIGS. 7, 8 and 9 graphically show various aberrations of zoom lens B composed by use of the common zoom optical system according to the first example of the preferred embodiment relative to d-line (λ=587.6 nm) in a wide-angle end state (f=5.95 mm), an intermediate focal length state (f=17.00 mm), and a telephoto end state (f=29.55 mm), respectively, when the system focusing at infinity.

In respective graphs showing the various aberrations, FNO denotes the f-number, Y denotes the image height, and A denotes half angle of view corresponding to each image height, respectively. In the graph showing spherical aberration, the value of the f-number corresponding to the maximum aperture, in the graph showing astigmatism and distortion, the maximum value of the image height are shown, respectively, and in the graph showing coma, the value of each half angle of view is shown.

Furthermore, in the graph showing spherical aberration, a solid line indicates spherical aberration and a broken line indicates a sine condition, respectively. In the graph showing astigmatism, a solid line indicates a sagittal image plane and a broken line indicates a meridional image plane, respectively.

The reference symbols of the first example of the preferred embodiment are the same in the graphs showing the various aberration of examples as described blow.

As is apparent from the respective graphs, the zoom lenses A and B composed by use of the common zoom optical system according to the first example of the embodiment show superb optical performance as a result of good corrections to various aberrations in each focal length state from the wide-angle end state to the telephoto end state.

SECOND EXAMPLE

Figure 10:
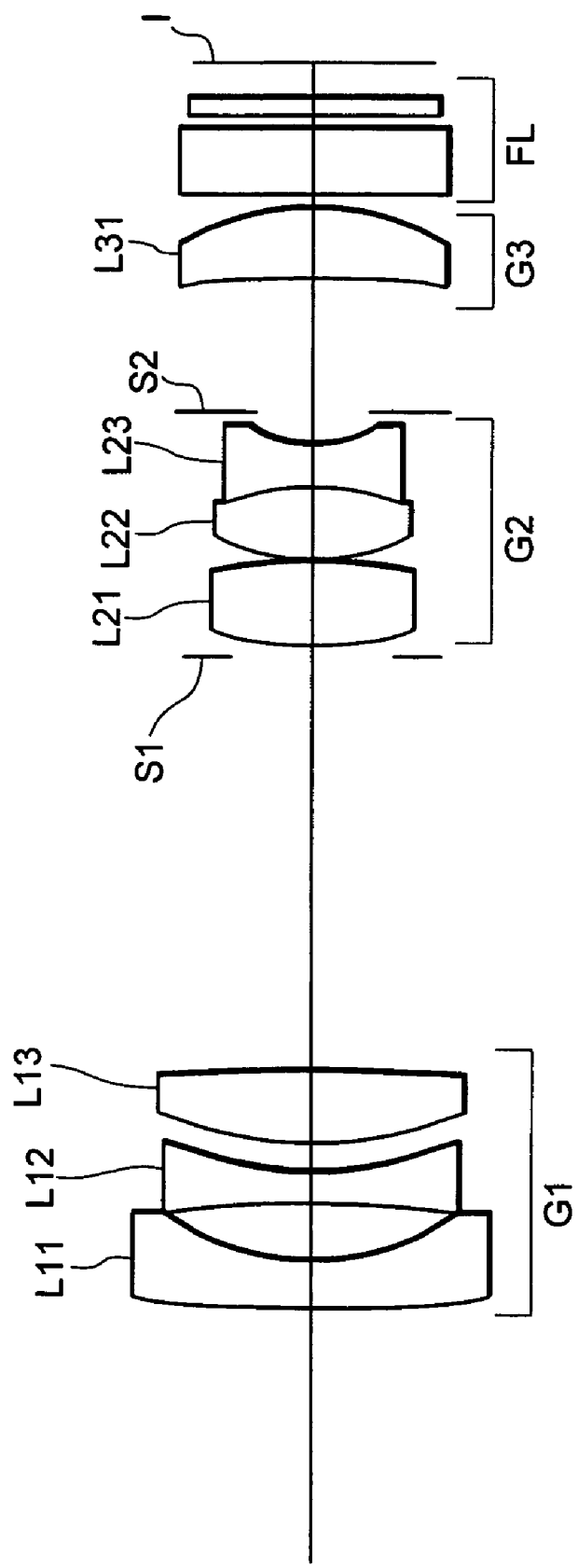
FIG. 10 is a diagram showing lens construction of a zoom lens A composed by use of the common zoom optical system according to a second example of the present invention.
Figure 11:
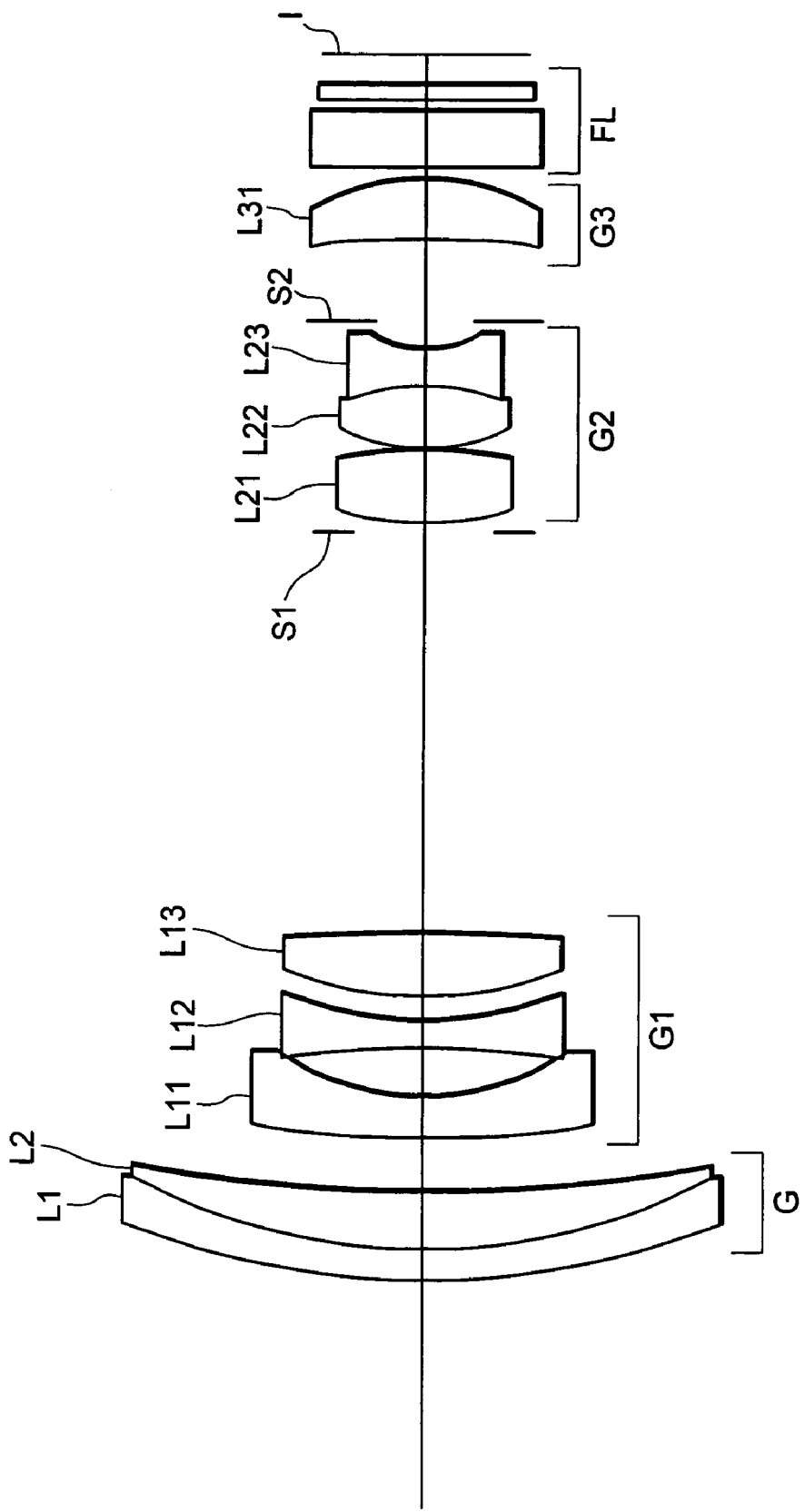
FIG. 11 is a diagram showing lens construction of a zoom lens B composed by use of the common zoom optical system according to the second example of the present invention.

FIGS. 10 and 11 are diagrams showing lens constructions of zoom lenses A an B composed by use of the common zoom optical system according to the second example of the preferred embodiment of the present invention.

In zoom lens A shown in FIG. 10, a first lens group G1 includes, in order from an object side, a negative meniscus lens L11 with a convex surface facing to the object side, a double concave negative lens L12, and a double convex positive lens L13.

A second lens group G2 includes, in order from the object side, an aperture stop S1, a double convex positive lens L21, a negative cemented lens consisting of a double convex positive lens L22 and a double concave negative lens L23, and a flare stop S2.

A third lens group G3 is composed of a single positive meniscus lens element L31 with a convex surface facing to an image.

A filter group FL includes a filter such as a low pass filter, an infrared cut filter, or the like.

The aperture stop S1 and the flare stop S2 are moved in a body with each lens composing second lens group G2 upon zooming from a wide-angle end state to a telephoto end state.

In the zoom lens B shown in FIG. 11, a positive lens group G includes a positive cemented lens constructed by, in order from the object side, a negative meniscus lens L1 with a convex surface facing to the object side and a positive meniscus lens L2 with a convex surface facing to the object side.

Except for the positive lens group G, each lens group, the filter group FL, an image plane I, and the image pick-up device are the same configurations as those of the zoom lens A which is the common zoom optical system, so that the explanations will be left out.

Various values for specifications of zoom lenses A and B composed by use of the common zoom optical system of the second example of the preferred embodiment of the present invention are shown below in Tables 4 and 5.

TABLE 4

[Specifications of zoom lens A]

|    | W | M | T |
| --- | --- | --- | --- |
| f = | 5.85 | 7.51 | 16.50 |
| FNO = | 2.72 | 3.09 | 5.05 |
| 2ω = | 65.86° | 51.08° | 23.49 |

TABLE 4-continued

|   | r | d | n | ν |
|---|---|---|---|---|
| 1 | 51.5415 | 1.59 | 1.83400 | 37.16 |
| 2 | 9.1437 | 2.00 | | |
| 3 | −34.7858 | 1.09 | 1.80400 | 46.57 |
| 4 | 12.9922 | 1.00 | | |
| 5 | 14.2095 | 2.50 | 1.80518 | 25.42 |
| 6 | −65.2003 | (d6) | | |
| 7 | 0.0000 | 0.40 | (aperture stop S1) | |
| *8 | 11.1099 | 3.00 | 1.58913 | 61.25 |
| 9 | −18.5397 | 0.10 | | |
| 10 | 7.2938 | 2.50 | 1.74399 | 44.79 |
| 11 | −9.1514 | 1.50 | 1.72150 | 29.23 |
| 12 | 4.0867 | 1.14 | | |
| 13 | 0.0000 | (d13) | (flare stop S2) | |
| 14 | 900.2833 | 2.50 | 1.58913 | 61.25 |
| *15 | −8.8221 | (d15) | | |
| 16 | 0.0000 | 2.30 | 1.54437 | 70.51 |
| 17 | 0.0000 | 0.33 | | |
| 18 | 0.0000 | 0.60 | 1.51633 | 64.14 |
| 19 | 0.0000 | (Bf) | | |

[Aspherical Data of the zoom lens A]

Surface Number 8

R = 11.1099
κ = −0.6716
C4 = −4.7220 × $10^{-5}$
C6 = −5.3446 × $10^{-6}$
C8 = +3.4442 × $10^{-7}$
C10 = −7.9591 × $10^{-9}$

Surface Number 15

R = −8.8221
κ = +0.0000
C4 = −7.4874 × $10^{-4}$
C6 = +1.8052 × $10^{-5}$
C8 = −9.0479 × $10^{-7}$
C10 = +1.8043 × $10^{-8}$

[Variable Distance Data of the zoom lens A]

|   | W | M | T |
|---|---|---|---|
| f | 5.8496 | 7.5115 | 16.4986 |
| d6 | 14.5460 | 10.6063 | 2.8148 |
| d13 | 4.6306 | 6.7634 | 17.6239 |
| d15 | 0.6000 | 0.6000 | 0.6000 |
| Bf | 1.1673 | 1.0641 | 0.9008 |

TABLE 5

[Specifications of the zoom lens B]

|   | W | M | T |
|---|---|---|---|
| f = | 5.99 | 9.01 | 29.50 |
| FNO = | 2.46 | 2.90 | 4.39 |
| 2ω = | 62.88° | 42.03° | 13.05° |

[Lens Data of the zoom lens B]

|   | r | d | n | ν |
|---|---|---|---|---|
| 1 | 32.8882 | 1.20 | 1.84666 | 23.78 |
| 2 | 24.5638 | 2.30 | 1.75500 | 52.32 |
| 3 | 65.7202 | (d3) | | |
| 4 | 51.5415 | 1.59 | 1.83400 | 37.16 |
| 5 | 9.1437 | 2.00 | | |
| 6 | −34.7858 | 1.09 | 1.80400 | 46.57 |
| 7 | 12.9922 | 1.00 | | |
| 8 | 14.2095 | 2.50 | 1.80518 | 25.42 |
| 9 | −65.2003 | (d9) | | |
| 10 | 0.0000 | 0.40 | (aperture stop S1) | |
| *11 | 11.1099 | 3.00 | 1.58913 | 61.25 |

TABLE 5-continued

|   |   |   |   |   |
|---|---|---|---|---|
| 12 | −18.5397 | 0.10 | | |
| 13 | 7.2938 | 2.50 | 1.74400 | 44.79 |
| 14 | −9.1514 | 1.50 | 1.72151 | 29.23 |
| 15 | 4.0867 | 1.14 | | |
| 16 | 0.0000 | (d16) | (flare stop S2) | |
| 17 | 900.2833 | 2.50 | 1.58913 | 61.25 |
| *18 | −8.8221 | (d18) | | |
| 19 | 0.0000 | 2.30 | 1.54437 | 70.51 |
| 20 | 0.0000 | 0.33 | | |
| 21 | 0.0000 | 0.60 | 1.51633 | 64.14 |
| 22 | 0.0000 | (Bf) | | |

[Aspherical Data of the zoom lens B]

Surface Number 11

R = 11.1099
κ = −0.6716
C4 = −4.7220 × $10^{-5}$
C6 = −5.3446 × $10^{-6}$
C8 = +3.4442 × $10^{-7}$
C10 = −7.9591 × $10^{-9}$

Surface Number 18

R = −8.8221
κ = +0.0000
C4 = −7.4874 × $10^{-4}$
C6 = +1.8052 × $10^{-5}$
C8 = −9.0479 × $10^{-7}$
C10 = +1.8043 × $10^{-8}$

[Variable Distance Data of the zoom lens B]

|   | W | M | T |
|---|---|---|---|
| f | 5.9895 | 9.0093 | 29.4965 |
| d3 | 2.1500 | 6.9089 | 31.4000 |
| d9 | 16.4040 | 10.0990 | 0.1000 |
| d16 | 3.0614 | 5.6832 | 14.1156 |
| d18 | 0.6000 | 0.6000 | 0.6000 |
| Bf | 1.2931 | 1.0534 | 1.1148 |

TABLE 6

[Values for Conditional Expressions of the zoom lens A]

fa1 = −12.855
fa2 = 11.468
fa3 = 14.845
fb1 = −12.855
fb2 = 11.468
fb3 = 14.845
Sa = 5.68
Sb = 5.68
(1)fa1/fb1 = 1.00
fa2/fb2 = 1.00
fa3/fb3 = 1.00
(2)Sa/Sb = 1.00

Figure 12:
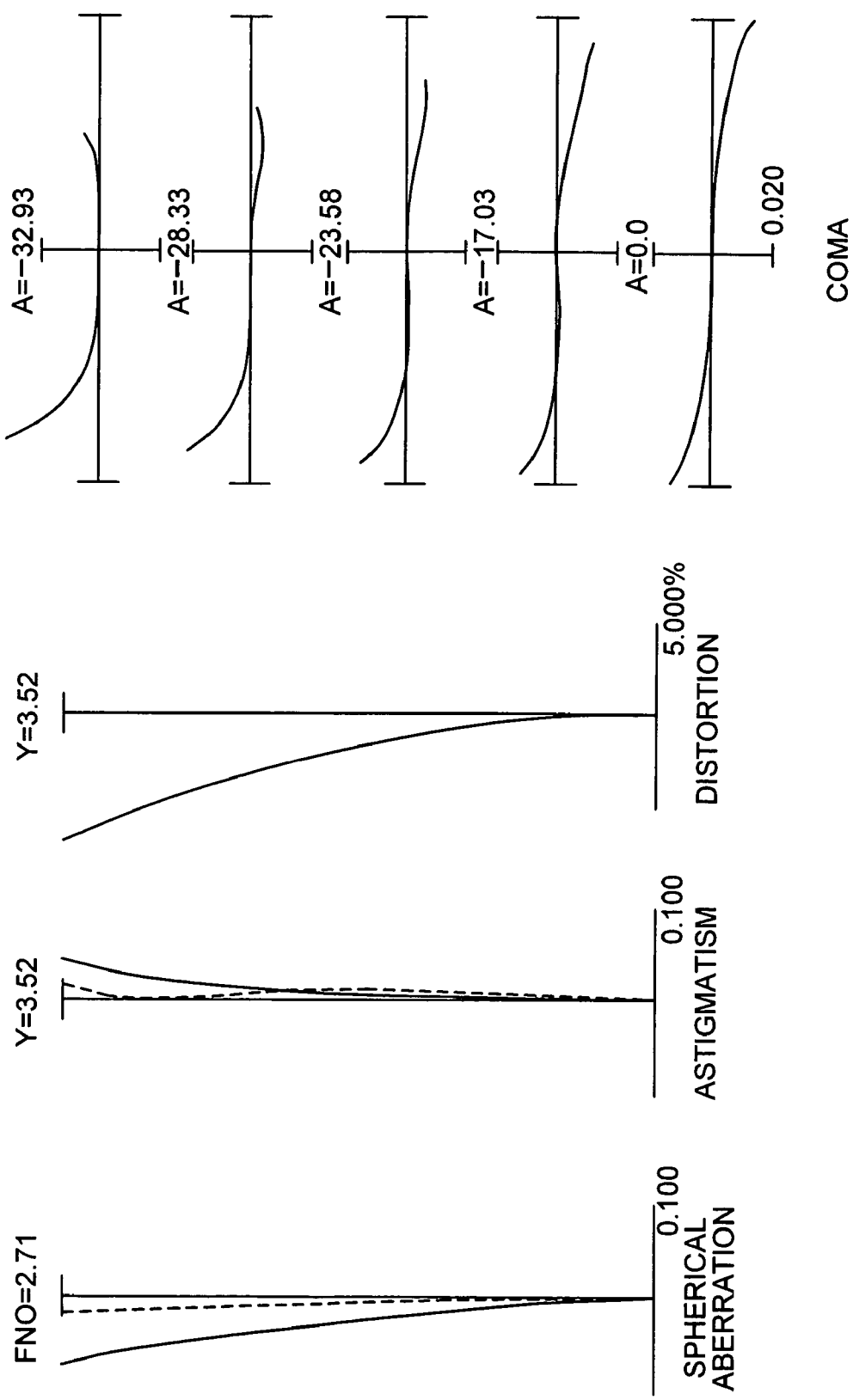
FIG. 12 graphically shows various aberrations of the zoom lens A composed by use of the common zoom optical system according to the second example of the present invention relative to d-line ($\lambda$=587.6 nm), in a wide-angle end state (f=5.85 mm) when the system focusing at infinity.
Figure 13:
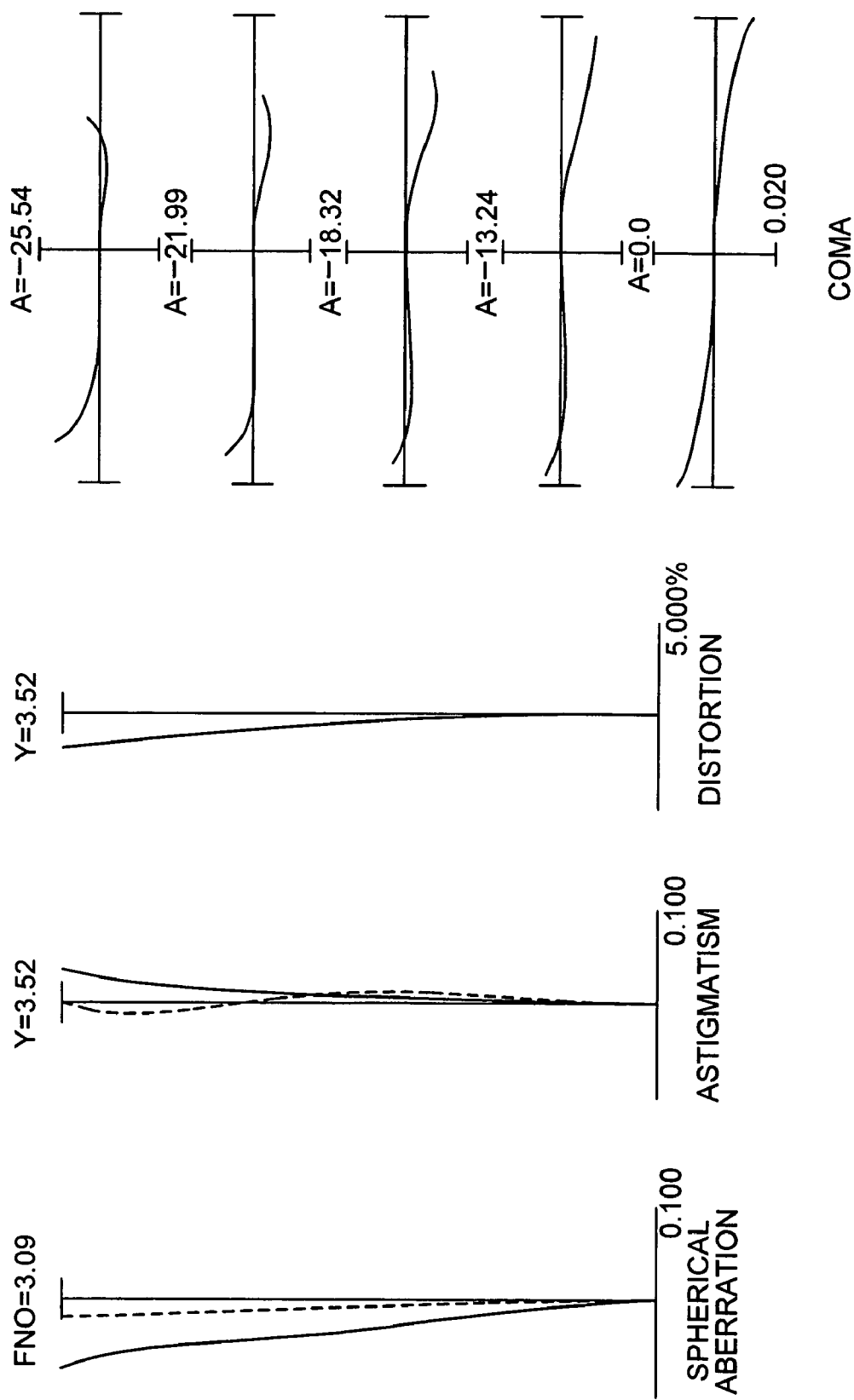
FIG. 13 graphically shows various aberrations of the zoom lens A composed by use of the common zoom optical system according to the first example of the present invention relative to d-line ($\lambda$=587.6 nm), in an intermediate focal length state (f=7.51 mm) when the system focusing at infinity.
Figure 14:
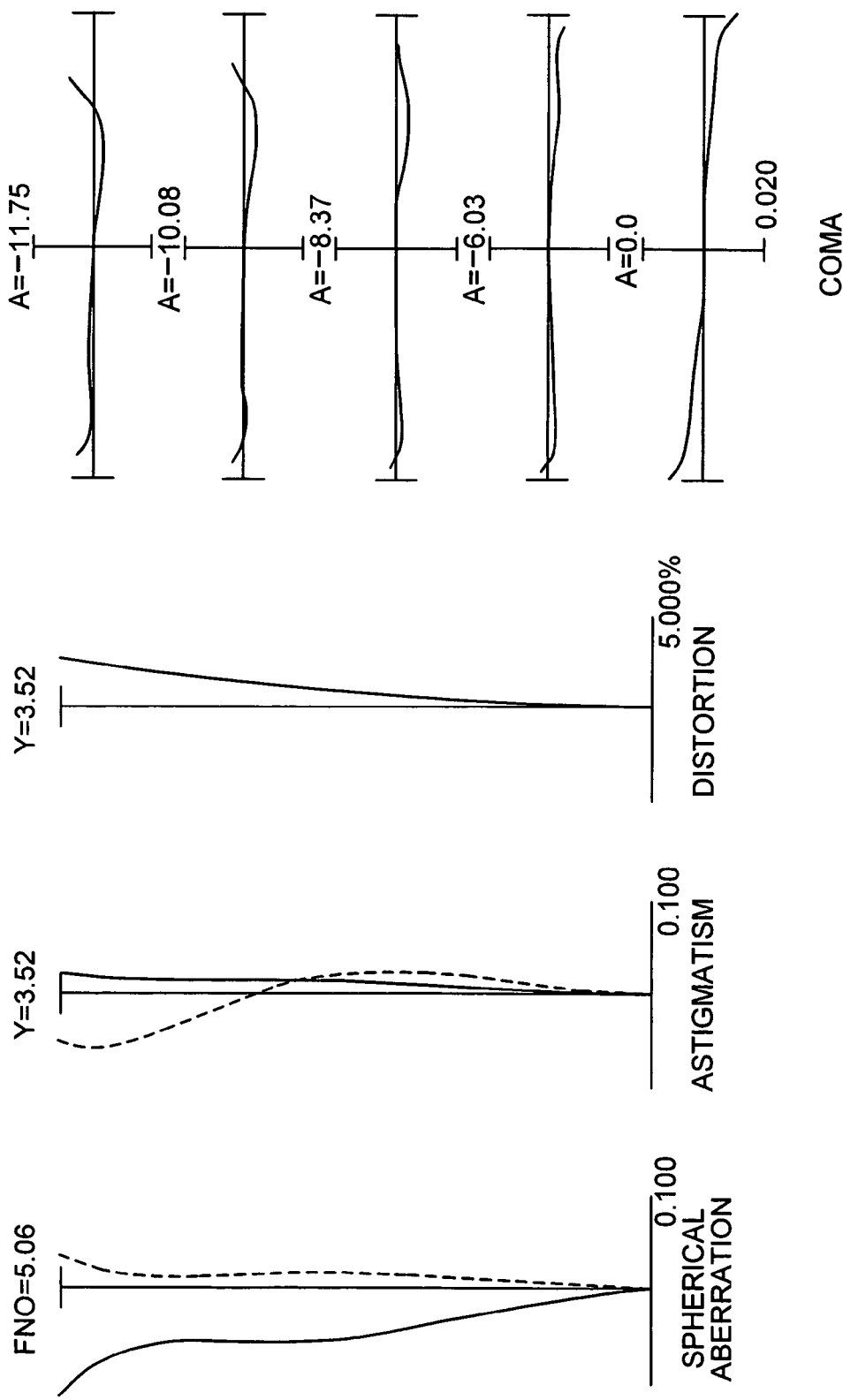
FIG. 14 graphically shows various aberrations of the zoom lens A composed by use of the common zoom optical system according to the first example of the present invention relative to d-line ($\lambda$=587.6 nm), in a telephoto end state (f=16.50 mm) when the system focusing at infinity.

FIGS. 12, 13 and 14 graphically show various aberrations of the zoom lens A composed by use of the common zoom optical system according to the second example of the preferred embodiment relative to d-line (λ=587.6 nm) in a wide-angle end state (f=5.85 mm) an intermediate focal length state (f=7.51 mm), and a telephoto end state (f=16.50 mm), respectively, when the system focusing at infinity.

Figure 15:
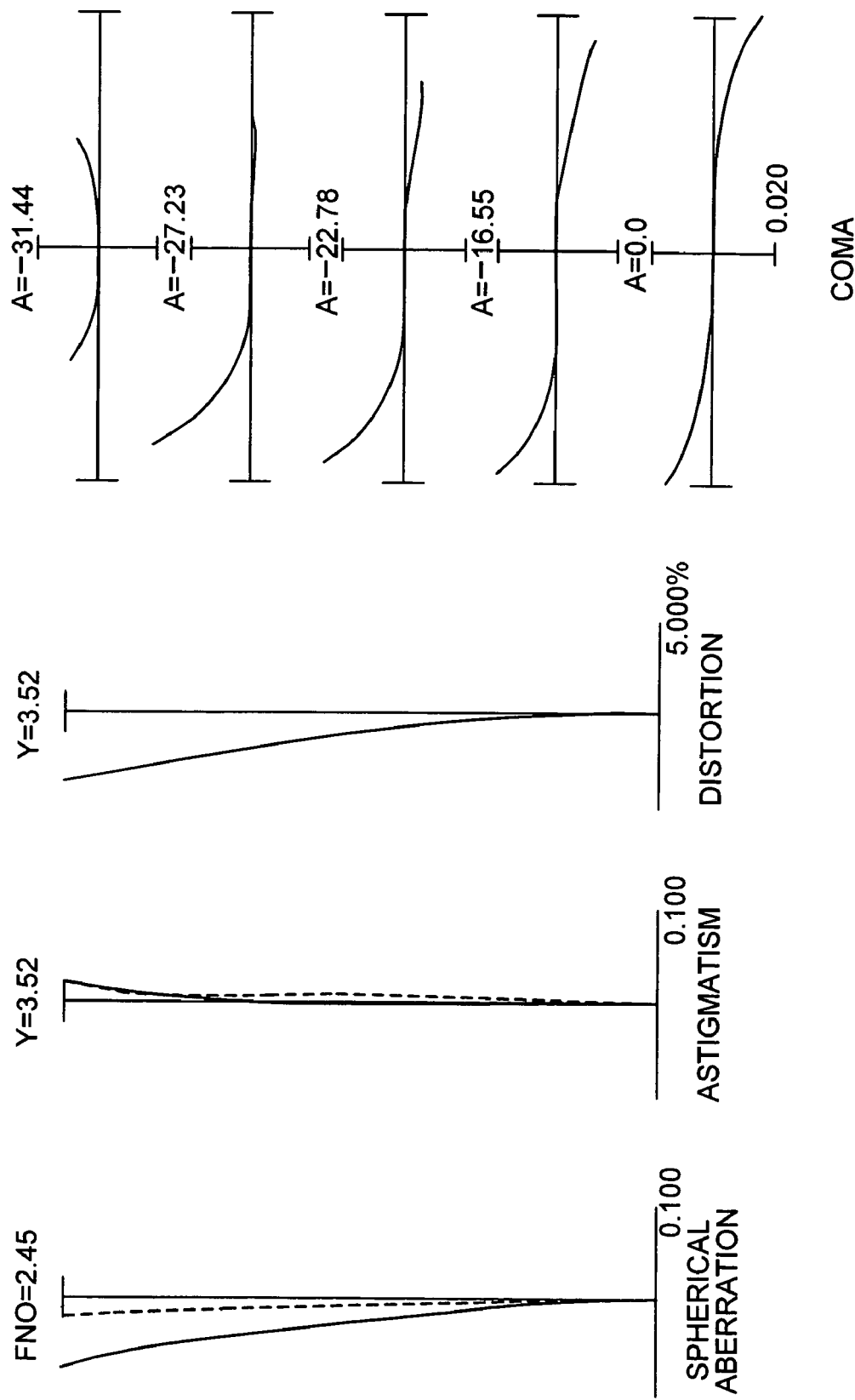
FIG. 15 graphically shows various aberrations of the zoom lens B composed by use of the common zoom optical system according to the first example of the present invention relative to d-line ($\lambda$=587.6 nm), in a wide-angle end state (f=5.99 mm) when the system focusing at infinity.
Figure 16:
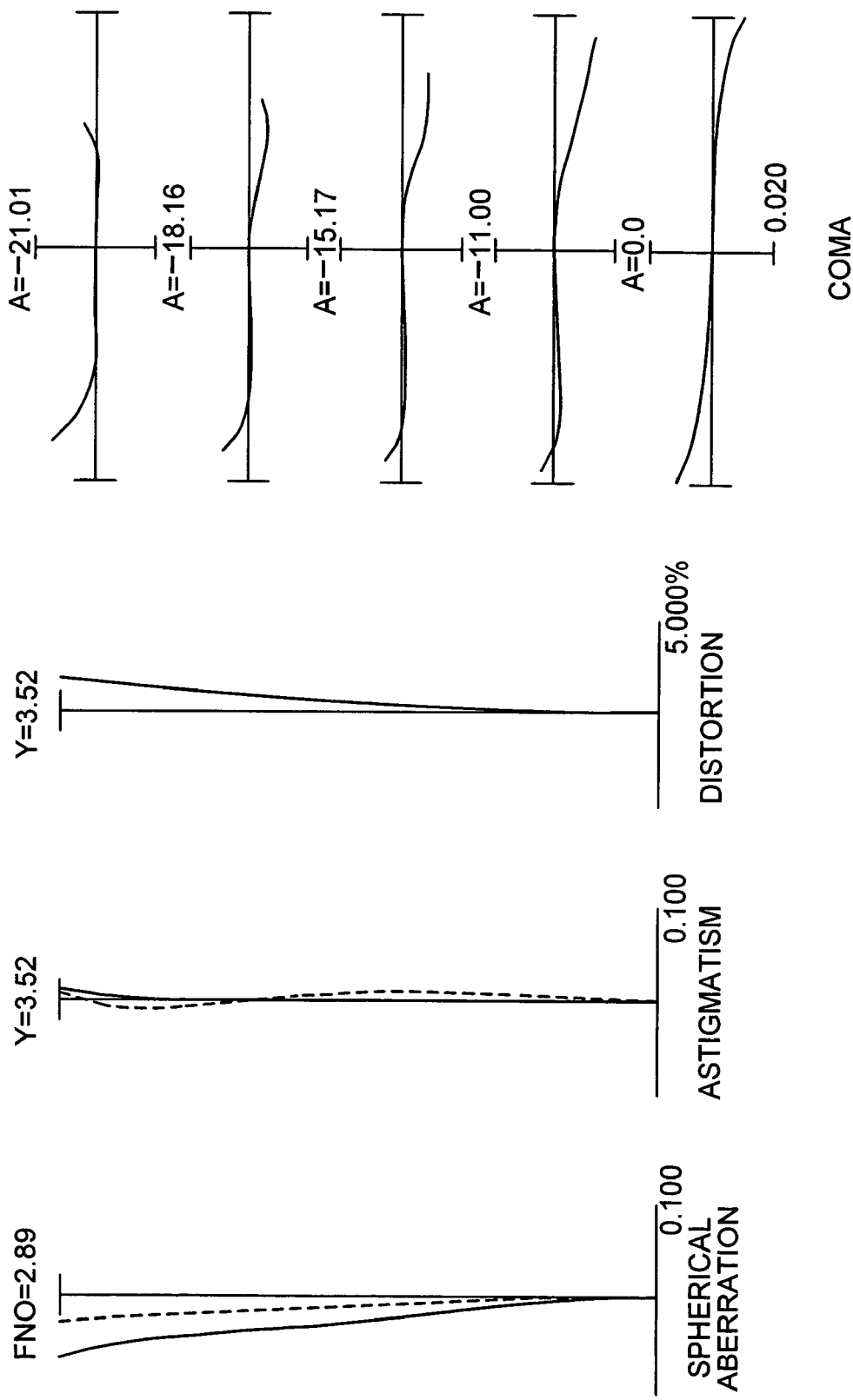
FIG. 16 graphically shows various aberrations of the zoom lens B composed by use of the common zoom optical system according to the first example of the present invention relative to d-line ($\lambda$=587.6 nm), in an intermediate focal length state (f=9.01 mm) when the system focusing at infinity.
Figure 17:
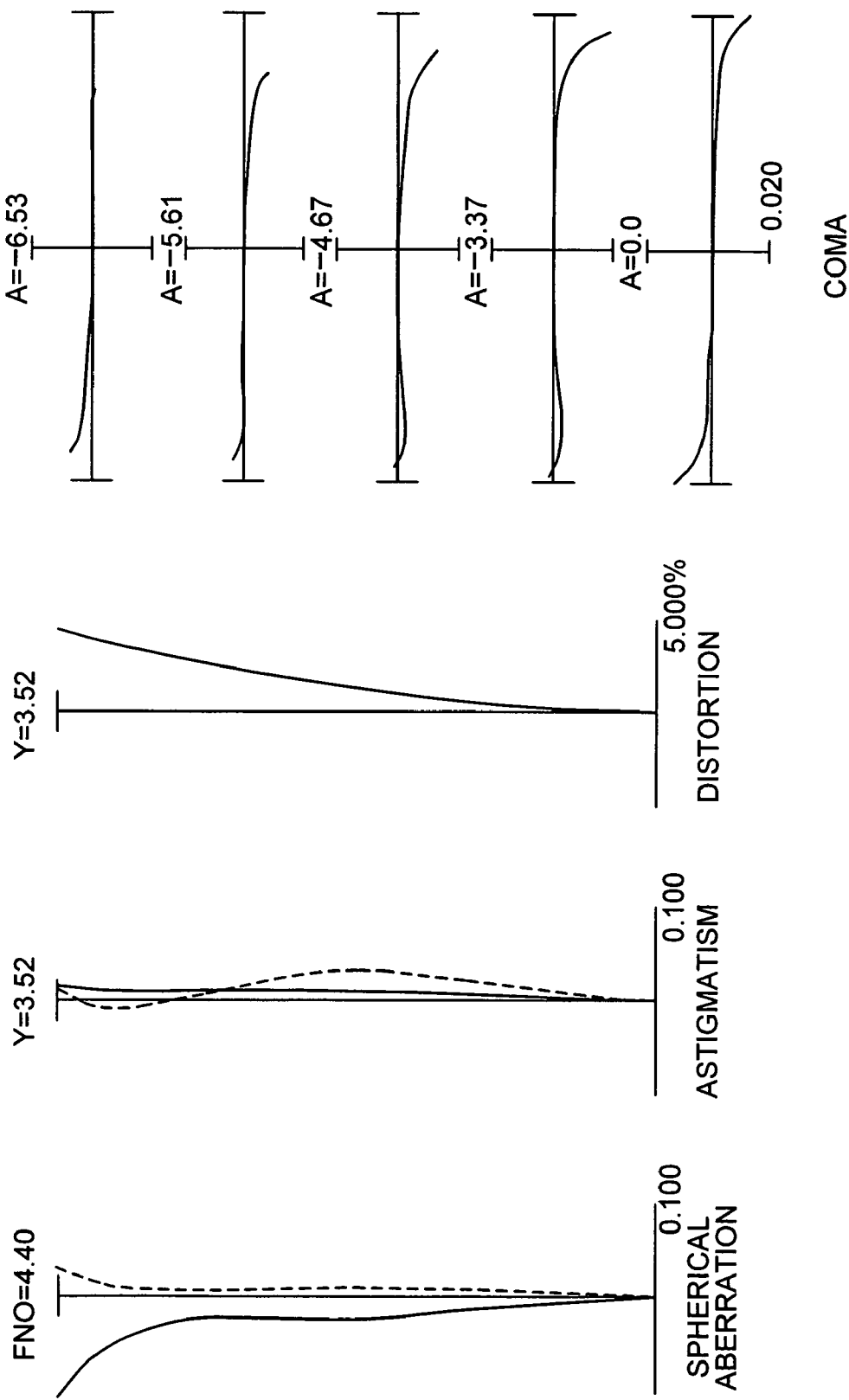
FIG. 17 graphically shows various aberrations of the zoom lens B composed by use of the common zoom optical system according to the first example of the present invention relative to d-line ($\lambda$=587.6 nm), in a telephoto end state (f=29.50 mm) when the system focusing at infinity.

FIGS. 15, 16 and 17 graphically show various aberrations of the zoom lens B composed by use of the common zoom optical system according to the second example of the preferred embodiment relative to d-line (λ=587.6 nm) in a wide-angle end state (f=5.99 mm), an intermediate focal length state (f=9.01 mm), and a telephoto end state (f=29.50 mm), respectively, when the system focusing at infinity.

As is apparent from the respective graphs, the zoom lenses A and B composed by use of the common zoom optical system according to the second example of the embodiment show superb optical performance as a result of good corrections to various aberrations in each focal length state from the wide-angle end state to the telephoto end state.

In the above-described respective examples, the common zoom optical system is built into zoom lenses A and B as the lens component intact, but the common zoom optical system of the present invention is not limited to this, and by modifying the aerial distances of the lens elements in the optical system or the radii of curvature thereof a little bit, it enables the modified system to be built into another zoom lens, too.

According to respective examples of the embodiment, the common zoom optical system can be provided that is almost commonly used in a plurality of zoom lenses and is capable of suppressing fluctuation in aberrations and deviation in the position of the image plane upon zooming. To this end, by standardizing the lens component of the lens groups or the lens barrel parts inside the lens barrel in the plurality of zoom lenses, the lens component and the like can be developed at a time, thereby enabling the development period to be shortened.

Regarding a production, inspection process of a component can be implemented at a single site, so that troubles like a similar component is mixed into can be avoided in advance. And, in an assembling process and the like, by assembling similar component in large quantity, workers' skill is enhanced, so that assembling stability can be secured. With respect to cost, mass-produced same parts enables a great reduction of cost.

As stated above, by using the already-existing common component, it becomes possible to develop a plurality of products having different specifications while holding down a buildup in development manpower and production facilities.

Additional advantages and modification will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. In a group of zoom lenses that includes a first zoom lens and a second zoom lens, a zoom optical system used as a component in each of the first zoom lens and the second zoom lens and including lens groups common to the first zoom lens and the second zoom lens, and wherein:
   the first zoom lens and the second zoom lens each performs zooming from a wide-angle end state to a telephoto end state, and a first moving trajectory of the lens groups in the first zoom lens is different from a second moving trajectory of lens groups in the second zoom lens, and wherein:
   the lens groups of the first zoom lens consist of the zoom optical system alone;
   the lens groups of the second zoom lens include at least one lens group that is located at an object side of the zoom optical system in addition to the lens groups of the zoom optical system; and
   a distance between the at least one lens group and an adjacent lens group in the zoom optical system varies when the second zoom lens performs zooming from the wide-angle end state to the telephoto end state.

2. A group of zoom lenses according to claim 1, wherein the following conditional expression is satisfied:

$$0.90 < fan/fbn < 1.10$$

where fan denotes a focal length of an n-th lens group of the zoom optical system in an arbitrary zoom lens of the group of zoom lenses (n is an integer), and fbn denotes a focal length of an n-th lens group of the zoom optical system of zoom lenses of the group of zoom lenses other than the arbitrary zoom lens (n is an integer).

3. A group of zoom lenses according to claim 1, wherein:
   an aerial distance between adjacent lens elements within the lens groups of the zoom optical system is the same in the first zoom lens and the second zoom lens.

4. A group of zoom lenses according to claim 1, wherein at least one aspherical lens element is included in the zoom optical system.

5. A group of zoom lenses according to claim 1, wherein a filter group and an image pick-up device are included in the zoom optical system.

6. A group of zoom lenses according to claim 1, wherein the zoom optical system includes an aperture stop, and the following conditional expression is satisfied:

$$0.95 < Sa/Sb < 1.05$$

wherein Sa denotes a maximum diameter of the aperture stop in an arbitrary zoom lens of the group of zoom lenses containing the zoom optical system, and Sb denotes a maximum diameter of the aperture stop in zoom lenses of the group of zoom lenses containing the zoom optical system other than the arbitrary zoom lens.

7. A group of zoom lenses according to claim 1, wherein a lens group located at the most image side of the zoom optical system includes at least one aspherical lens element.

8. A group of zoom lenses according to claim 1, wherein:
   a lens group located at the most object side of the zoom optical system has negative refractive power; and
   the second zoom lens includes a lens group having positive refractive power located at the most object side of the zoom optical system.

9. A group of zoom lenses according to claim 8, wherein the zoom optical system comprises, in order from the object side:
   a first lens group having negative refractive power;
   a second lens group having positive refractive power; and
   a third lens group having positive refractive power, and wherein:
   the lens groups of the first zoom lens consist of the zoom optical system alone, and
   the lens groups of the second zoom lens include a lens group having positive refractive power located at the most object side of the zoom optical system.

10. In a group of zoom lenses that includes a first zoom lens and a second zoom lens, a zoom optical system used as a component in each of the first zoom lens and the second zoom lens and including lens groups common to the first zoom lens and the second zoom lens, and wherein:
   the first zoom lens and the second zoom lens each performs zooming from a wide-angle end state to a telephoto end state, and a first moving trajectory of the lens groups in the first zoom lens is different from a second moving trajectory of lens groups in the second zoom lens, and wherein:
   the lens groups of the first zoom lens consist of the zoom optical system alone;

the lens groups of the second zoom lens include at least one lens group in addition to the lens groups of the zoom optical system and wherein:

a lens group located at the most object side of the zoom optical system has negative refractive power; and the second zoom lens includes a lens group having positive refractive power located at the most object side of the zoom optical system.

11. A group of zoom lenses according to claim 10, wherein the zoom optical system comprises, in order from the object side:

a first lens group having negative refractive power;
a second lens group having positive refractive power; and
a third lens group having positive refractive power, and wherein:

the lens groups of the first zoom lens consist of the zoom optical system alone, and the lens groups of the second zoom lens include a lens group having positive refractive power located at the most object side of the zoom optical system.

12. In a group of zoom lenses that includes a first zoom lens and a second zoom lens, a zoom optical system used as a component in each of the first zoom lens and the second zoom lens and including lens groups common to the first zoom lens and the second zoom lens, and wherein:

the first zoom lens and the second zoom lens each performs zooming from a wide-angle end state to a telephoto end state, and a first moving trajectory of the lens groups in the first zoom lens is different from a second moving trajectory of the lens groups in the second zoom lens; and wherein:

the first zoom lens includes at least one lens group in addition to the zoom optical system; and the second zoom lens includes at least one lens group in addition to the zoom optical system, the second zoom lens being different from the first zoom lens.

13. A group of zoom lenses according to claim 12, wherein the following conditional expression is satisfied:

$$0.90 < fan/fbn < 1.10$$

where fan denotes a focal length of an n-th lens group of the zoom optical system in an arbitrary zoom lens of the group of zoom lenses (n is an integer), and fbn denotes a focal length of an n-th lens group of the zoom optical system of zoom lenses of the group of zoom lenses other than the arbitrary zoom lens (n is an integer).

14. A group of zoom lenses according to claim 12, wherein:

an aerial distance between adjacent lens elements within the lens groups of the zoom optical system is the same in a plurality of the zoom lenses containing the zoom optical system.

15. A method of manufacturing a group of zoom lenses including a first zoom lens and a second zoom lens comprising:

Providing, as a component of the first zoom lens and the second zoom lens, a zoom optical system including lens groups common to the first zoom lens and the second zoom lens, and providing different lens group moving trajectories for the first and second zoom lenses when performing zooming from a wide-angle end state to a telephoto end state, and wherein the first zoom lens is provided with the zoom optical system alone and the second zoom lens is provided with at least one lens group that is located at an object side of the zoom optical system in addition to the zoom optical system, and a distance between the at least one lens group and an adjacent lens group in the zoom optical system varies when the second zoom lens performs zooming from the wide-angle end state to the telephoto end state.

16. A method of manufacturing a group of zoom lenses including a first zoom lens and a second zoom lens comprising:

providing, as a component of the first zoom lens and the second zoom lens, a zoom optical system including lens groups common to the first zoom lens and the second zoom lens, and providing different lens group moving trajectories for the first and second zoom lenses when performing zooming from a wide-angle end state to a telephoto end state, and wherein the first zoom lens is provided with at least one lens group in addition to the zoom optical system, and the second zoom lens is provided with at least one lens group in addition to the zoom optical system, the second zoom lens being different from the first zoom lens.

* * * * *